(12) United States Patent
Sudoh et al.

(10) Patent No.: US 7,806,212 B2
(45) Date of Patent: Oct. 5, 2010

(54) VEHICLE WITH VARIABLE AIR INTAKE ARRANGEMENT

(75) Inventors: Takehiko Sudoh, Shizuoka-ken (JP); Makoto Kobayashi, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 833 days.

(21) Appl. No.: 11/735,031

(22) Filed: Apr. 13, 2007

(65) Prior Publication Data
US 2007/0267235 A1 Nov. 22, 2007

(30) Foreign Application Priority Data
Apr. 14, 2006 (JP) ............................. 2006-111560
Sep. 20, 2006 (JP) ............................. 2006-253649

(51) Int. Cl.
*F02M 35/16* (2006.01)

(52) U.S. Cl. ................. 180/68.3; 180/219; 123/184.55; 123/577; 123/582; 123/492

(58) Field of Classification Search ................ 180/68.3, 180/219; 123/492, 577, 582, 184.55
See application file for complete search history.

(56) References Cited

U.S. PATENT DOCUMENTS

| | | | |
|---|---|---|---|
| 4,543,918 A | 10/1985 | Ma | |
| 4,759,320 A | 7/1988 | Fujii et al. | |
| 4,890,586 A | 1/1990 | Fujii et al. | |
| 5,740,770 A | 4/1998 | Morota | |
| 6,408,810 B1 | 6/2002 | Leipelt et al. | |
| 7,299,688 B2 | 11/2007 | Salvisberg | |
| 7,331,332 B2 | 2/2008 | Baumann et al. | |
| 7,533,645 B2 * | 5/2009 | Fujiwara et al. ........ | 123/184.55 |
| 2004/0216721 A1 | 11/2004 | Nagashii et al. | |
| 2006/0288673 A1 | 12/2006 | Wimmer | |
| 2007/0175430 A1 | 8/2007 | Yokoi | |
| 2007/0175431 A1 | 8/2007 | Yokoi | |

FOREIGN PATENT DOCUMENTS

| | | |
|---|---|---|
| JP | 63-177627 U | 11/1988 |
| JP | 63-182229 U | 11/1988 |
| JP | 02-223632 | 9/1990 |
| JP | 09-100720 | 4/1997 |

* cited by examiner

*Primary Examiner*—Erick Solis
(74) *Attorney, Agent, or Firm*—Keating & Bennett, LLP

(57) ABSTRACT

A vehicle, such as a motorcycle, includes an air intake assembly having a fixed funnel for introducing air to an intake port of an engine, and a movable funnel that selectively cooperates with the fixed funnel to introduce air to the intake port. The vehicle also includes a rotary shaft and a parallel linkage located on a first side of the movable funnel for movably supporting the movable funnel, and a drive source, such as a motor, located on a second side of the movable funnel generally opposite the first side for driving the parallel linkage. In one arrangement, the rotary shaft and parallel linkage are located on a forward side of the movable funnel and the drive source is located on the rearward side of the movable funnel.

20 Claims, 34 Drawing Sheets

[FIG. 1]
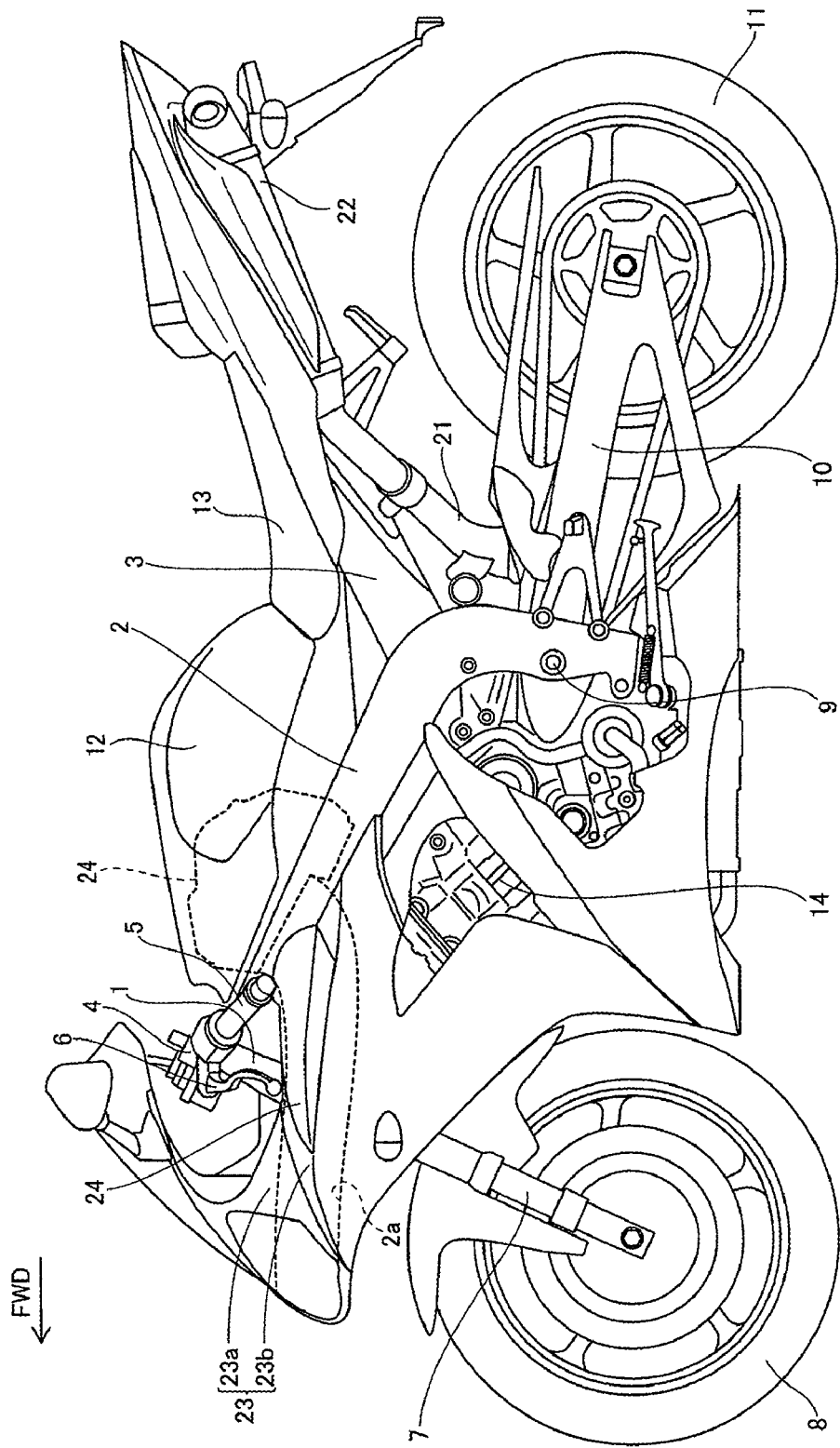

[FIG. 2]
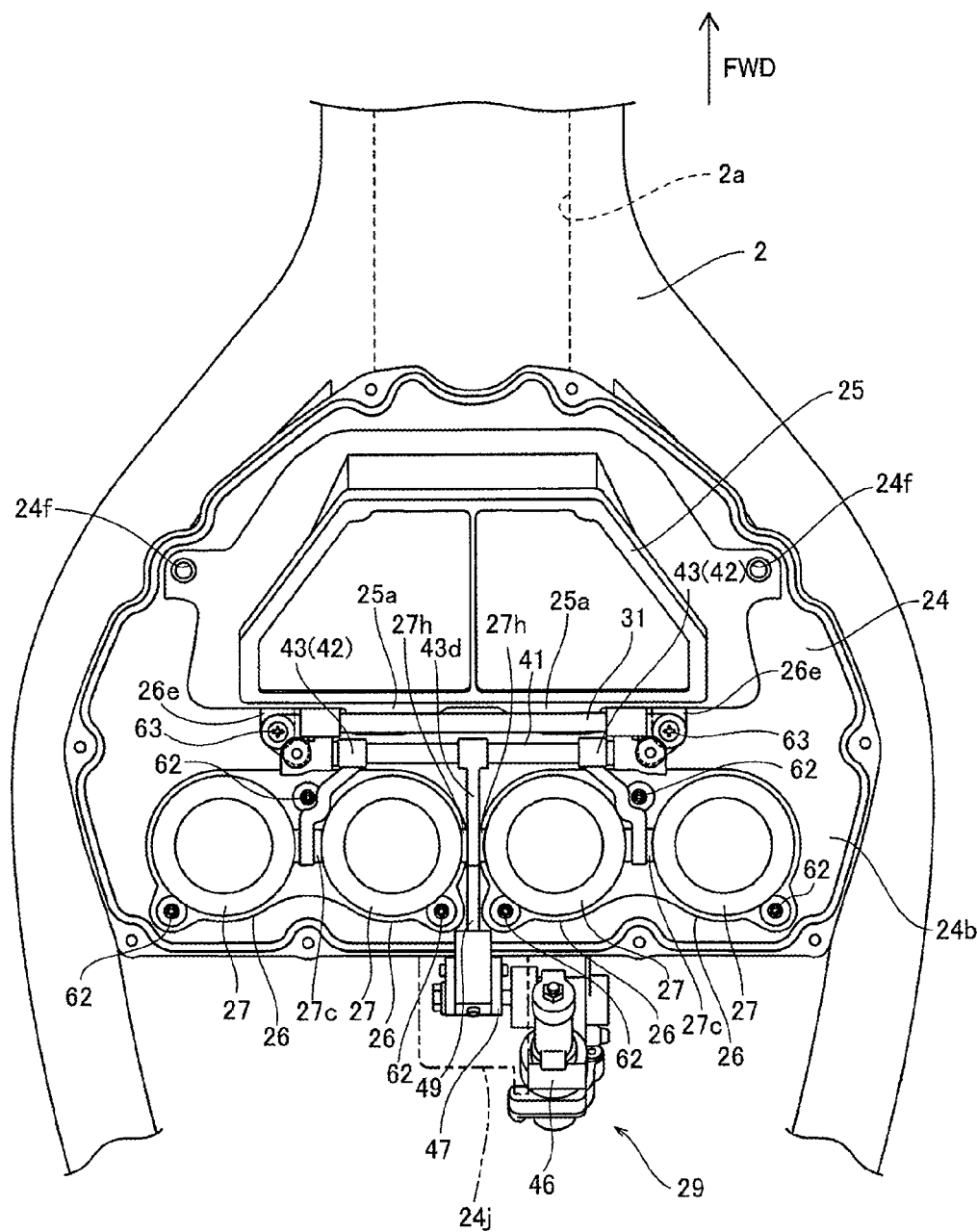

[FIG. 3]
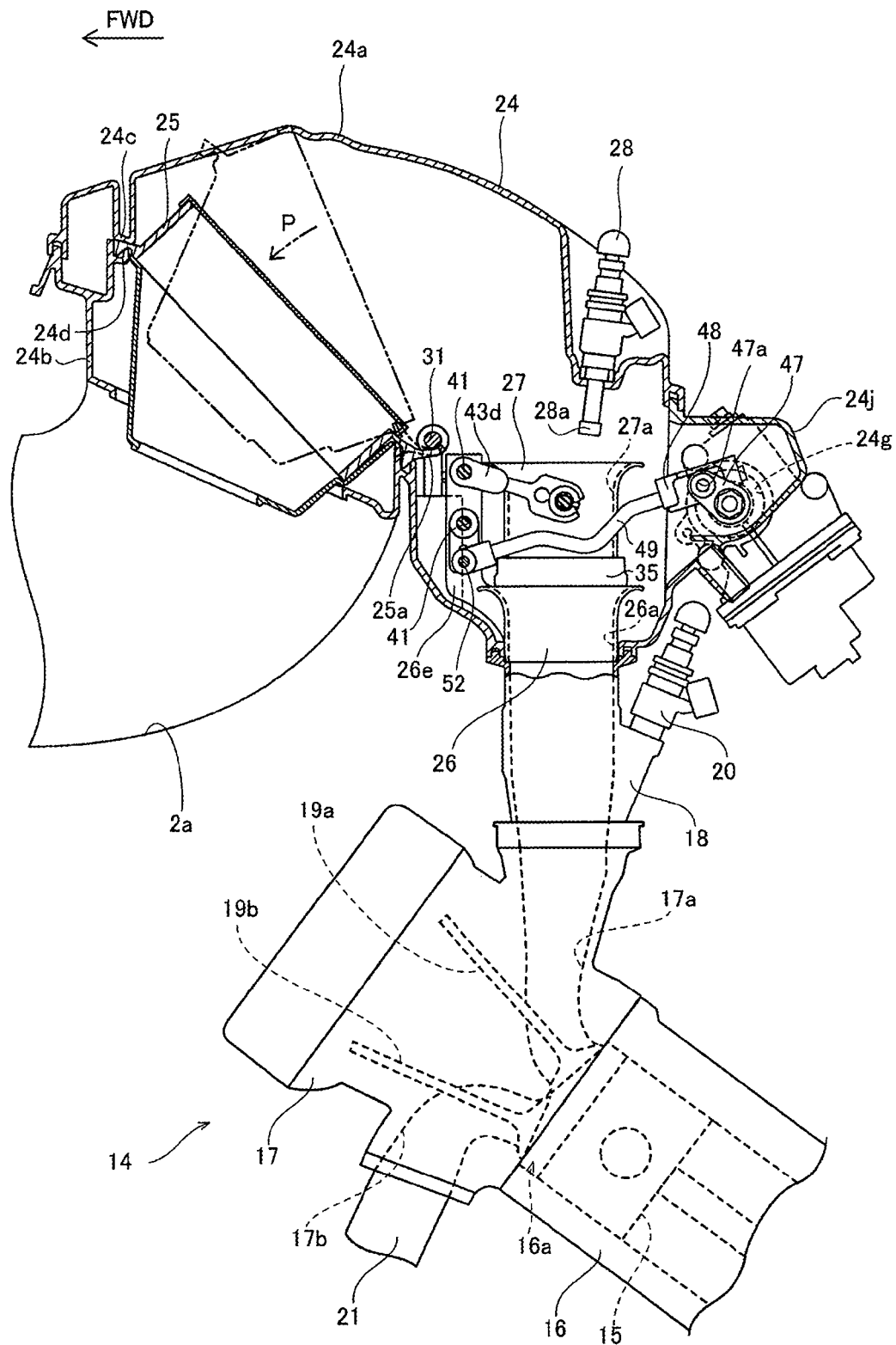

[FIG. 4]
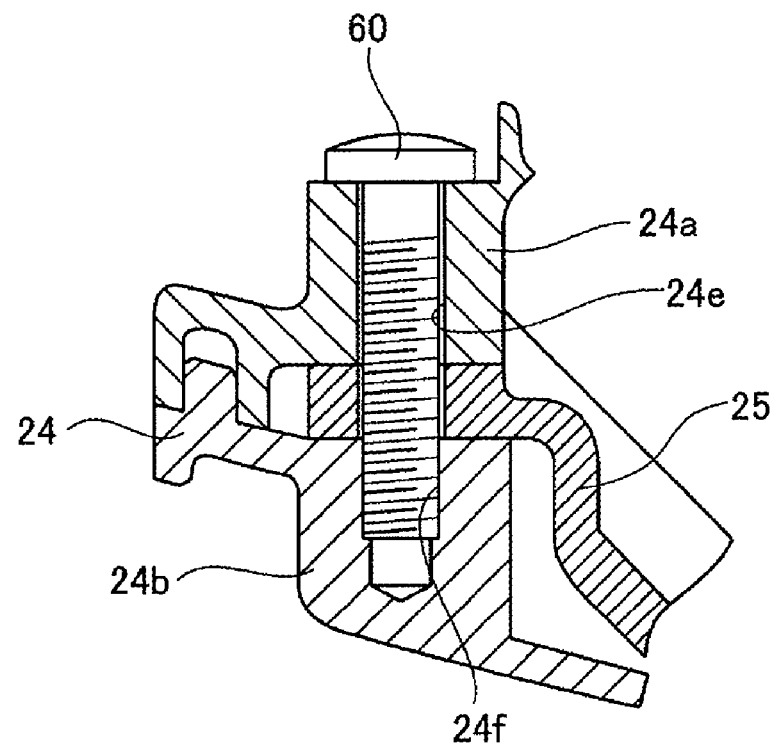

[FIG. 5]
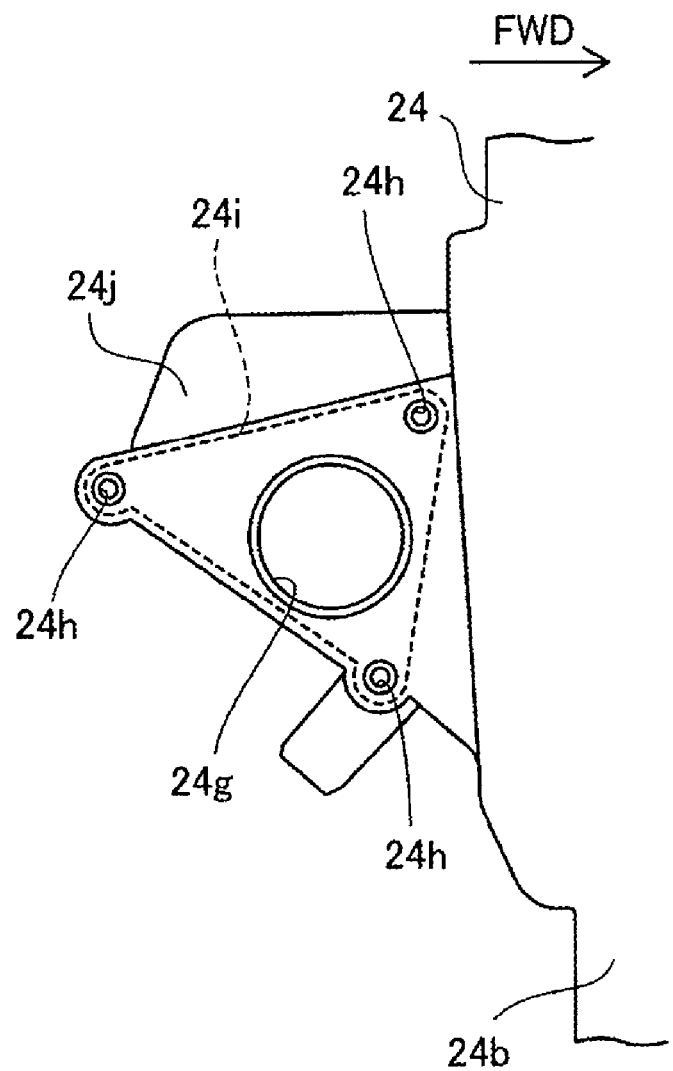

[FIG. 6]
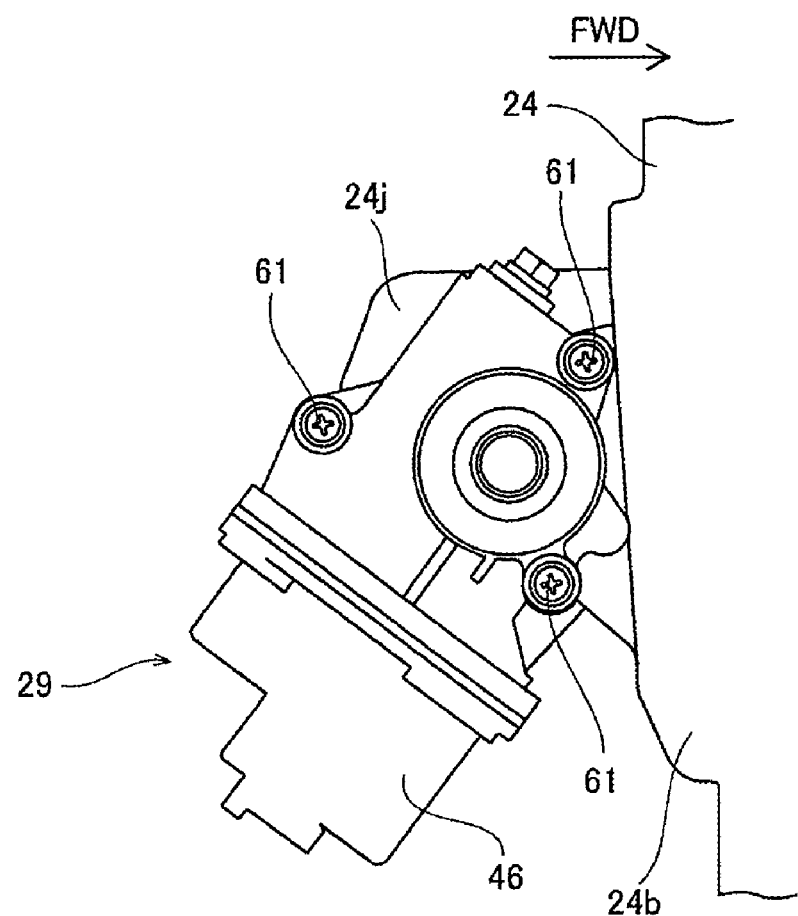

[FIG. 7]
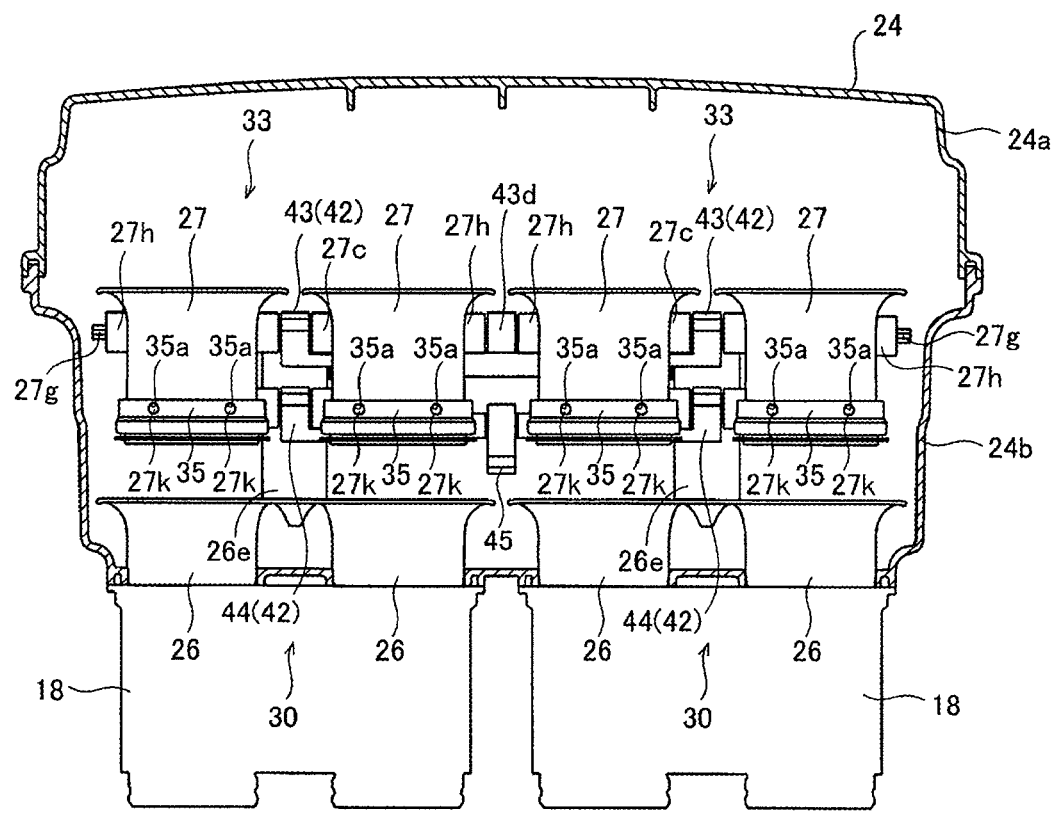

[FIG. 8]
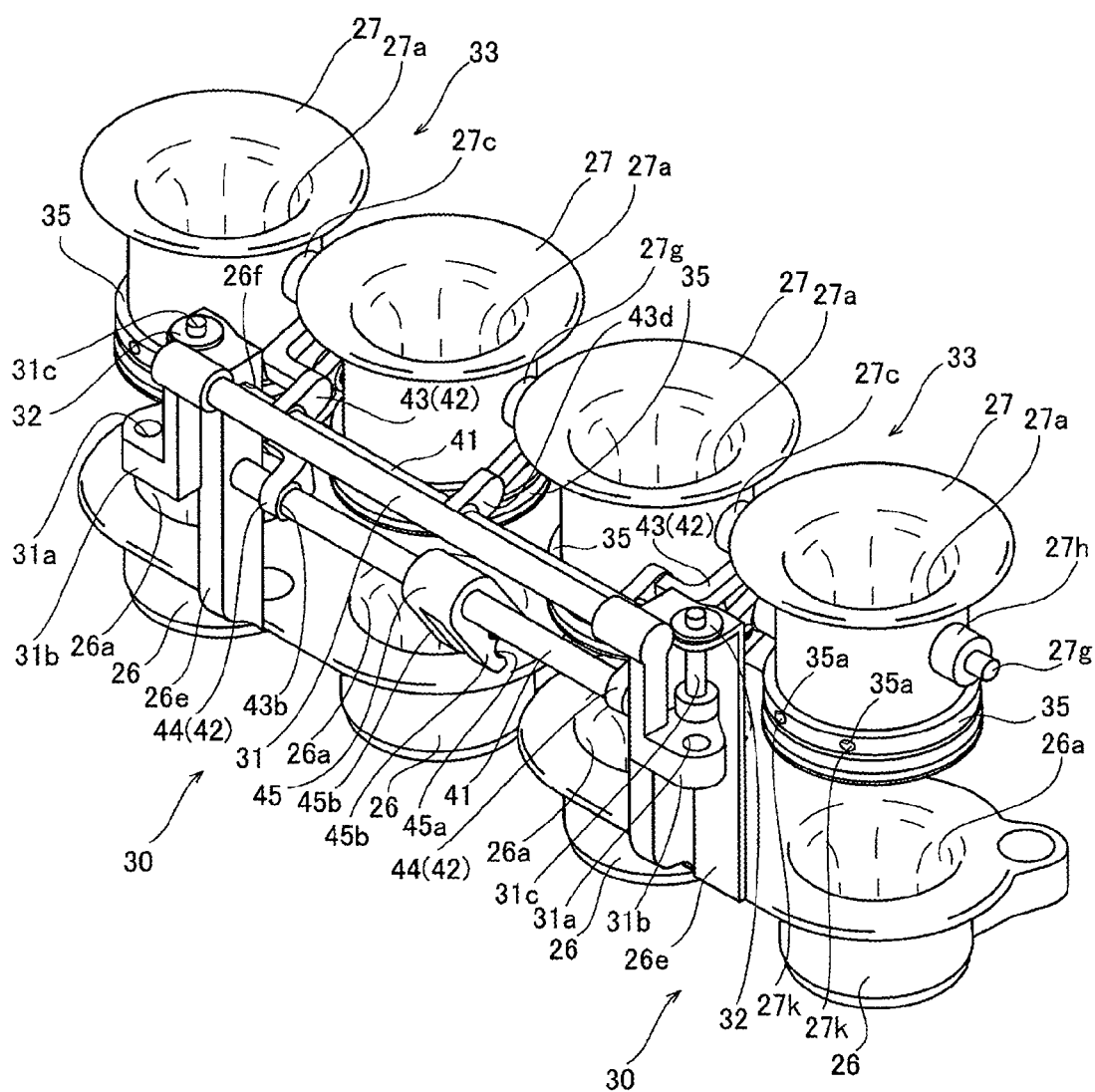

[FIG. 9]
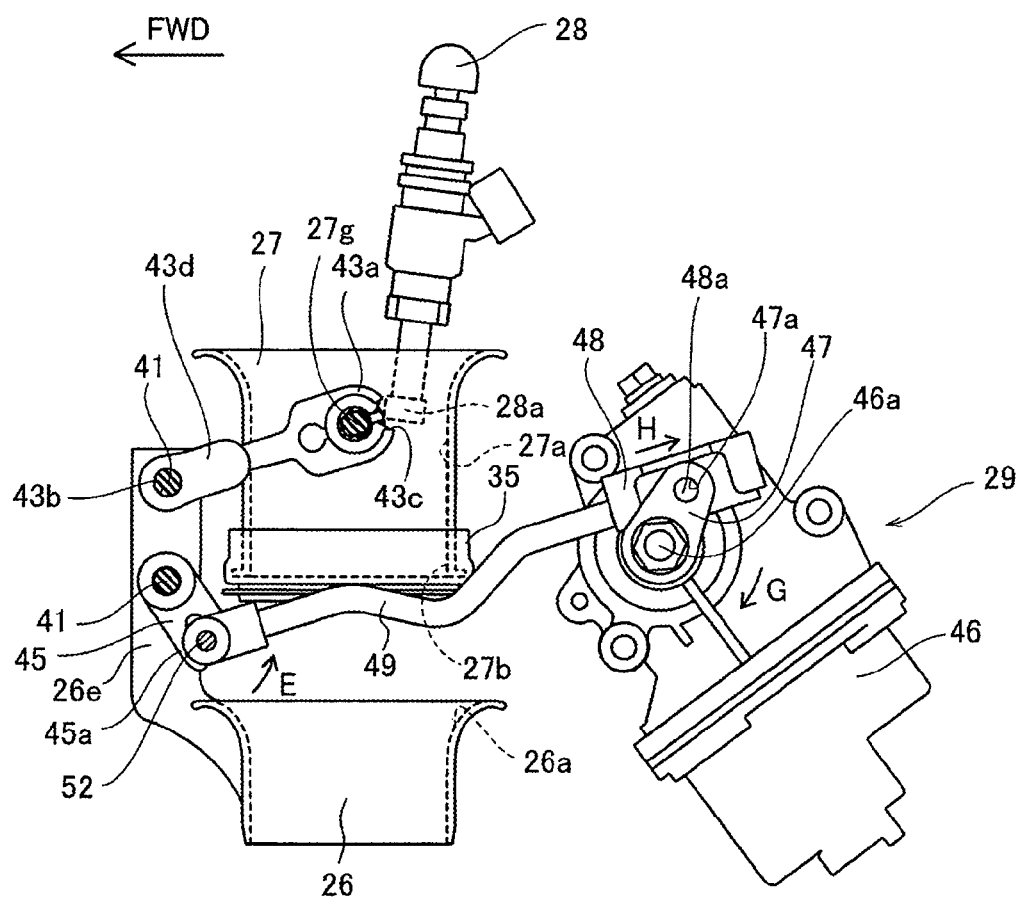

[FIG. 10]
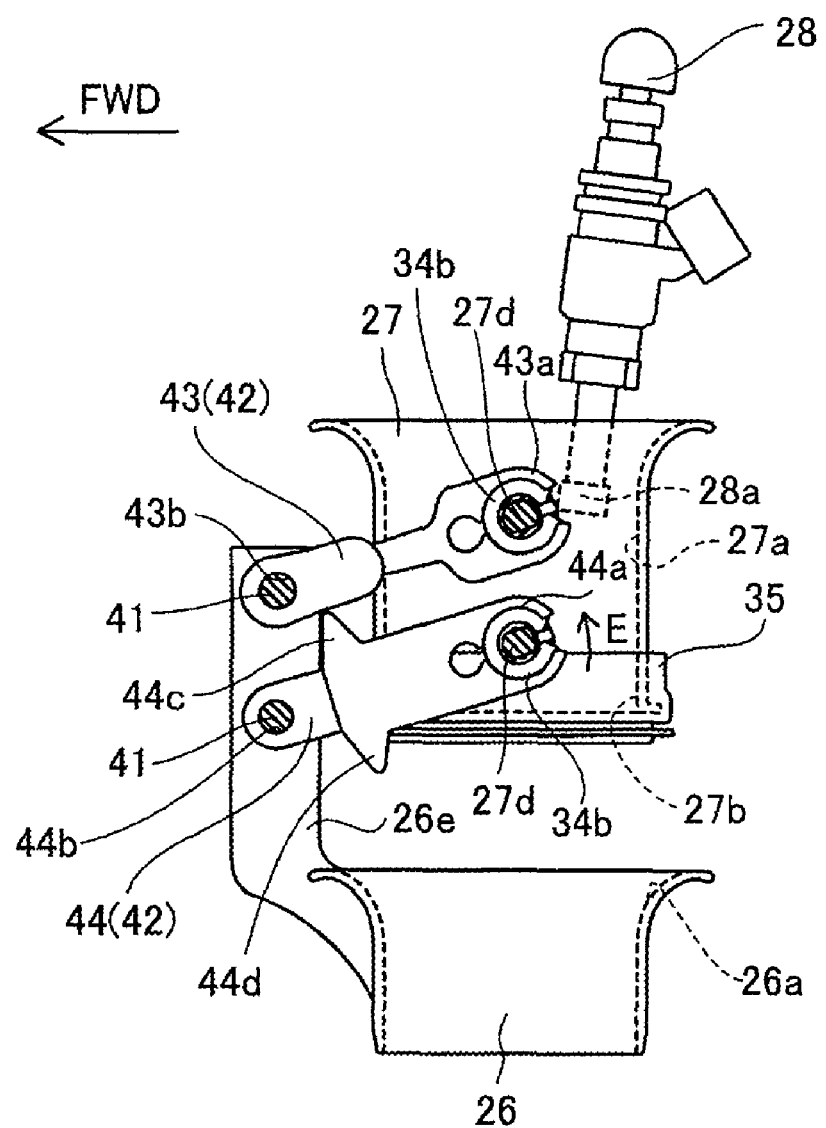

[FIG. 11]
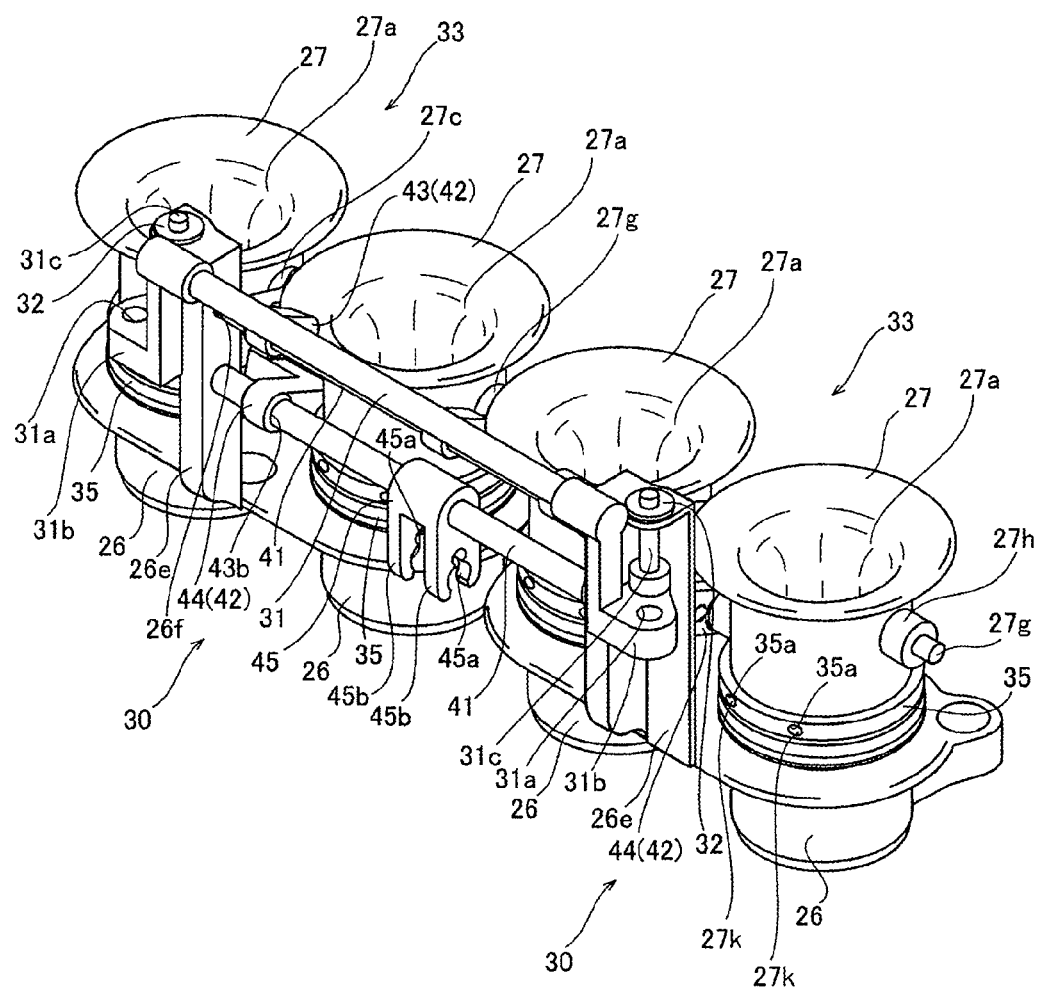

[FIG. 12]
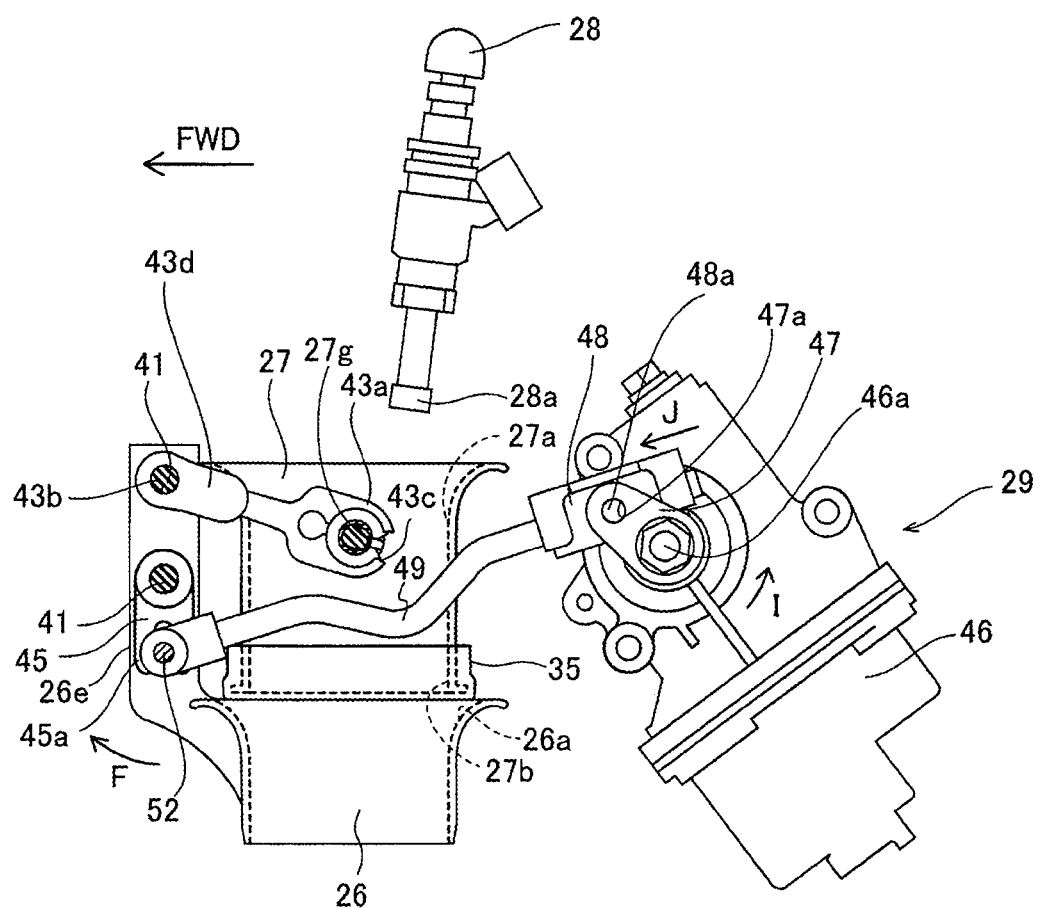

[FIG. 13]
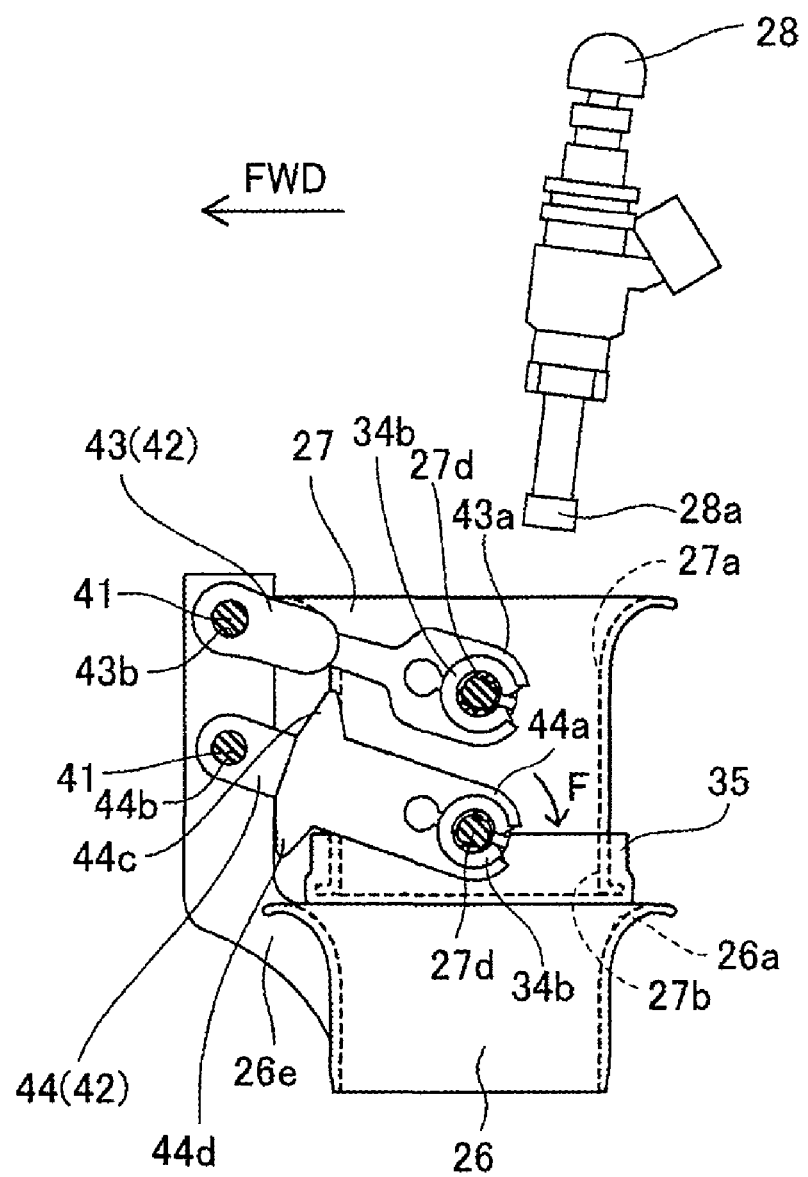

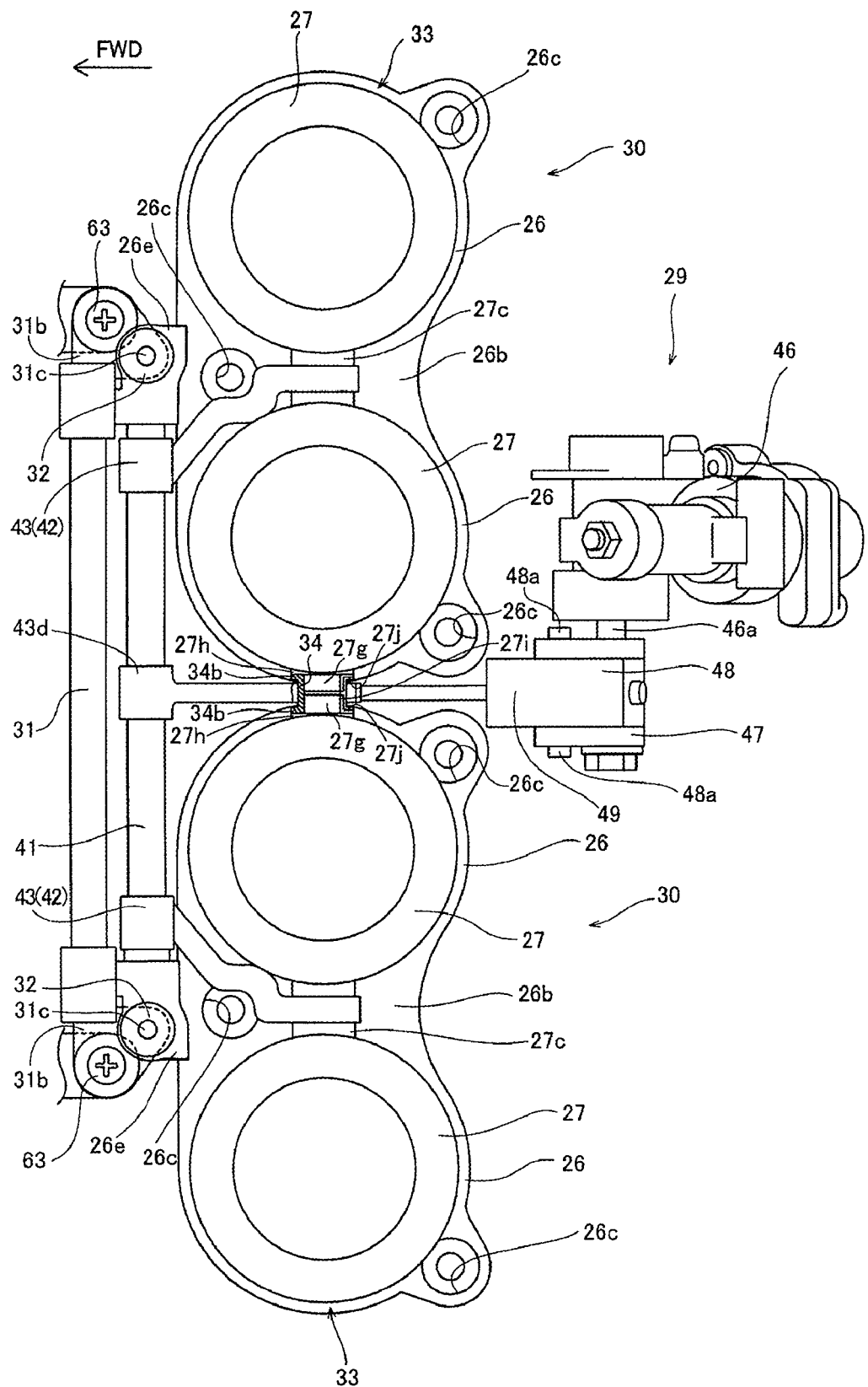

[FIG. 15]
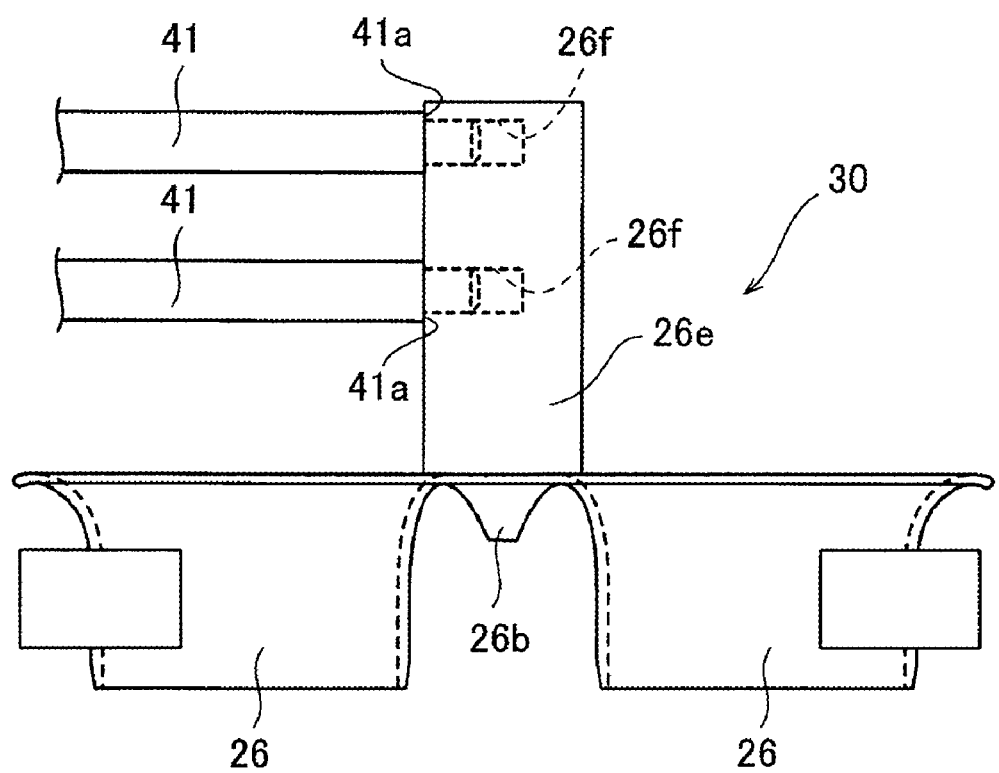

[FIG. 16]
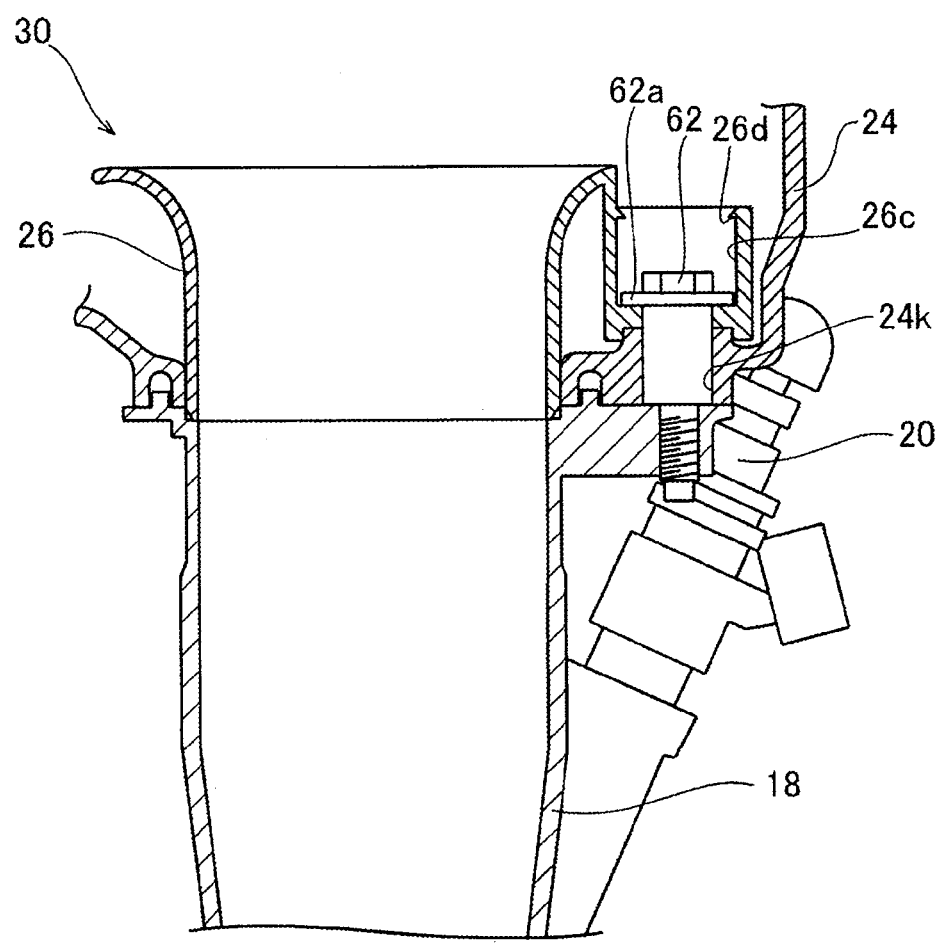

[FIG. 17]
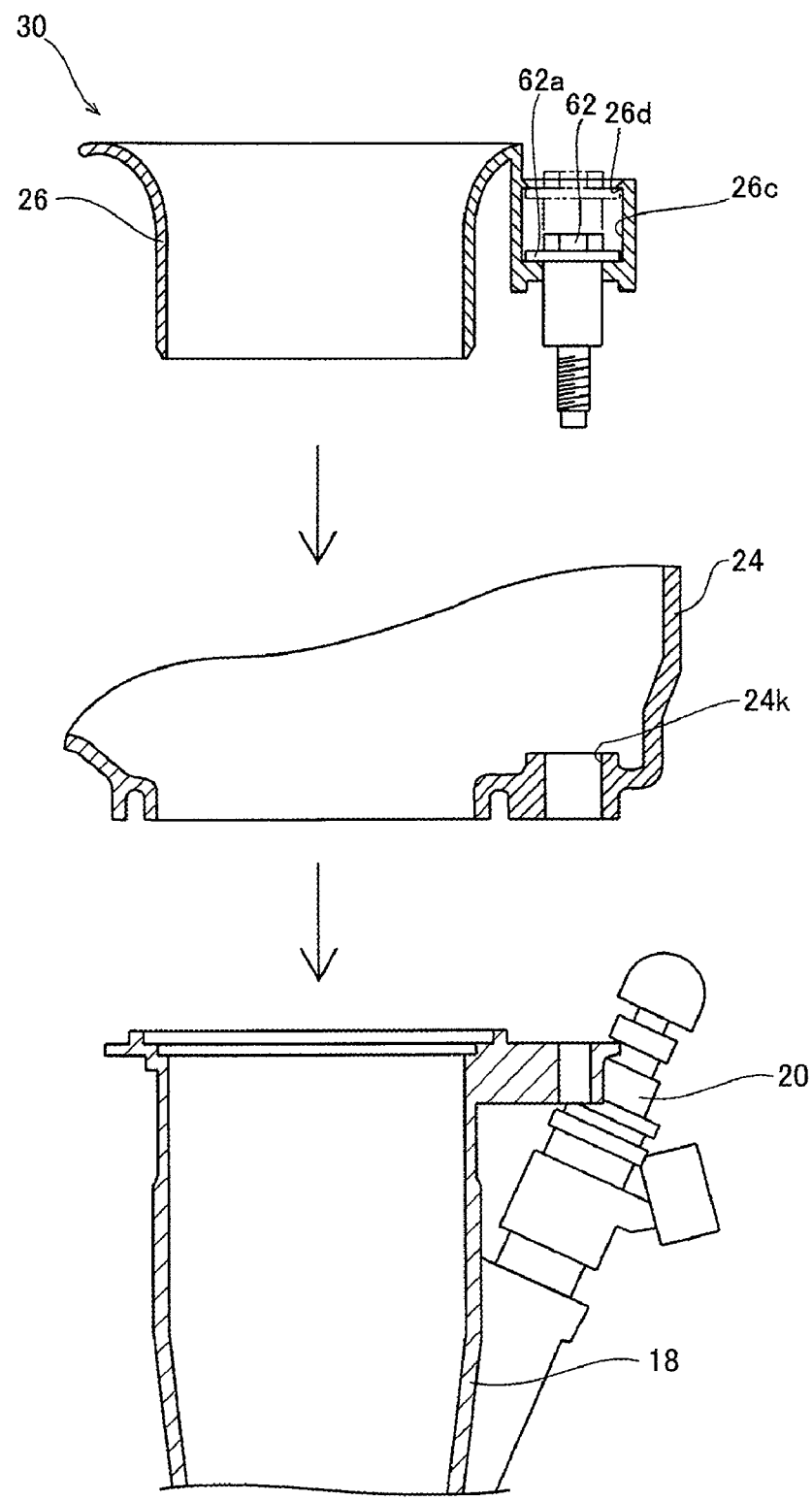

[FIG. 18]
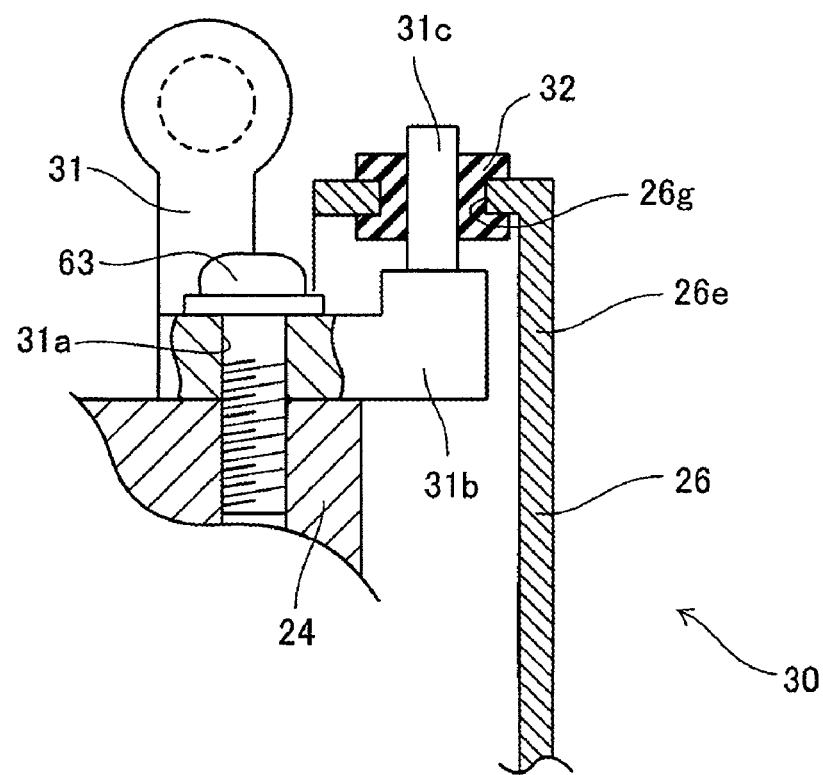

[FIG. 19]
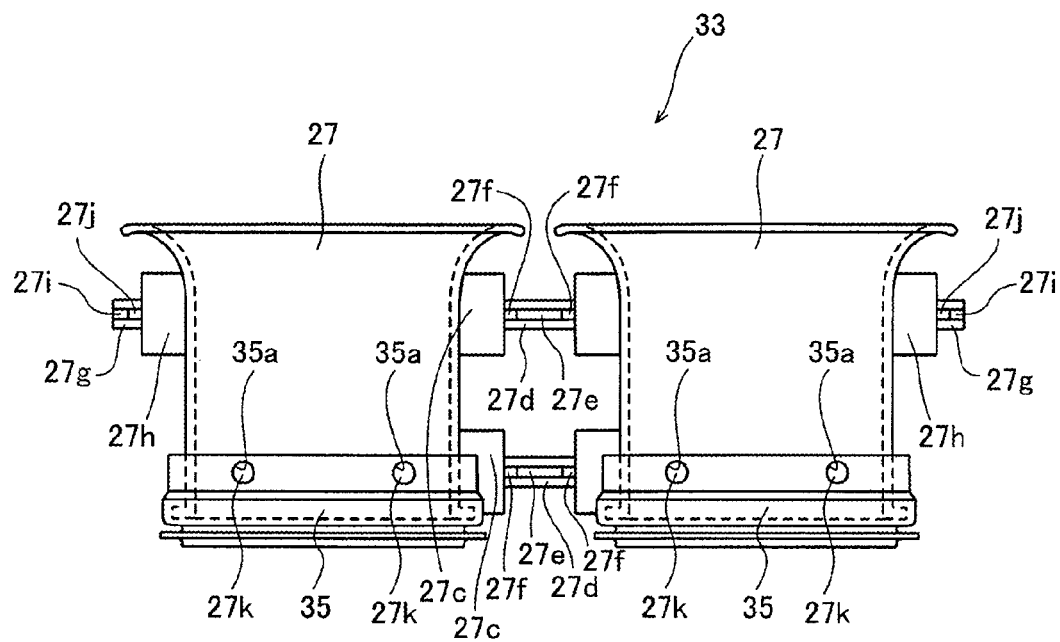

[FIG. 20]
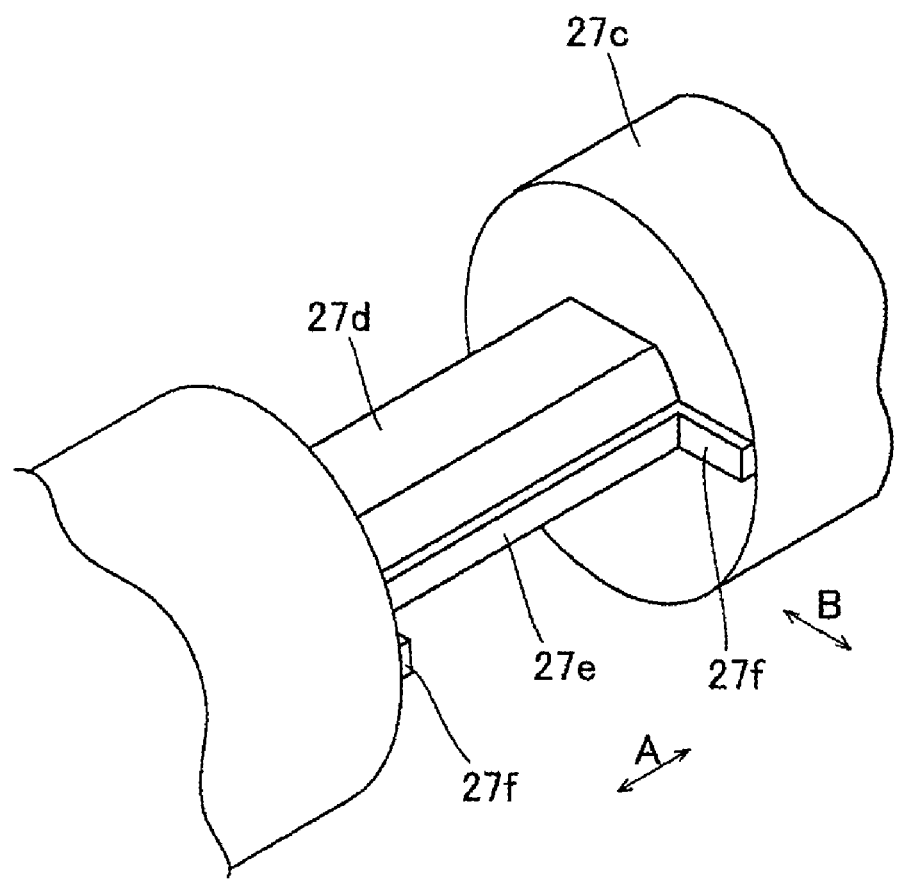

[FIG. 21]
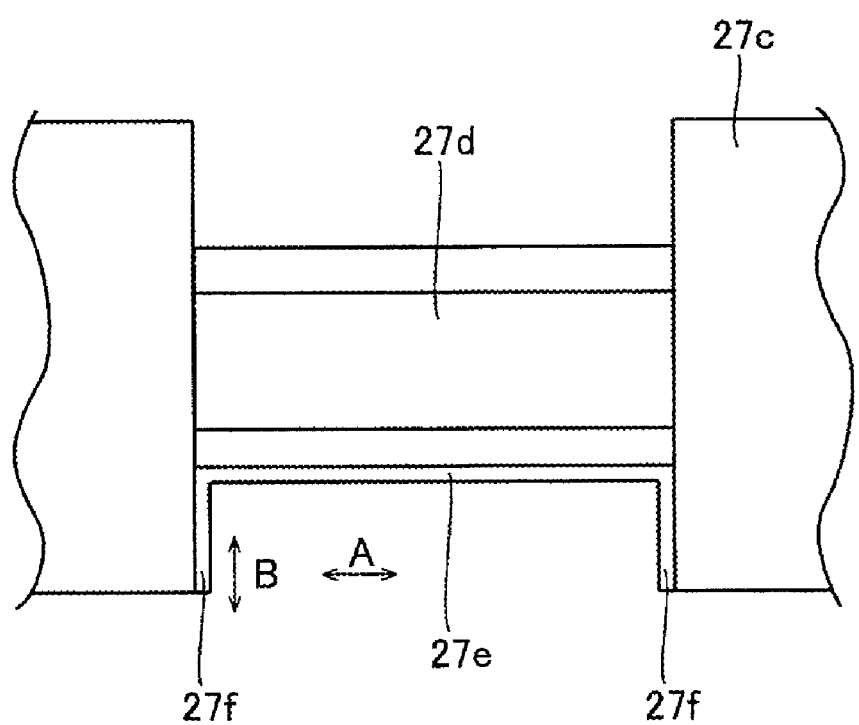

[FIG. 22]
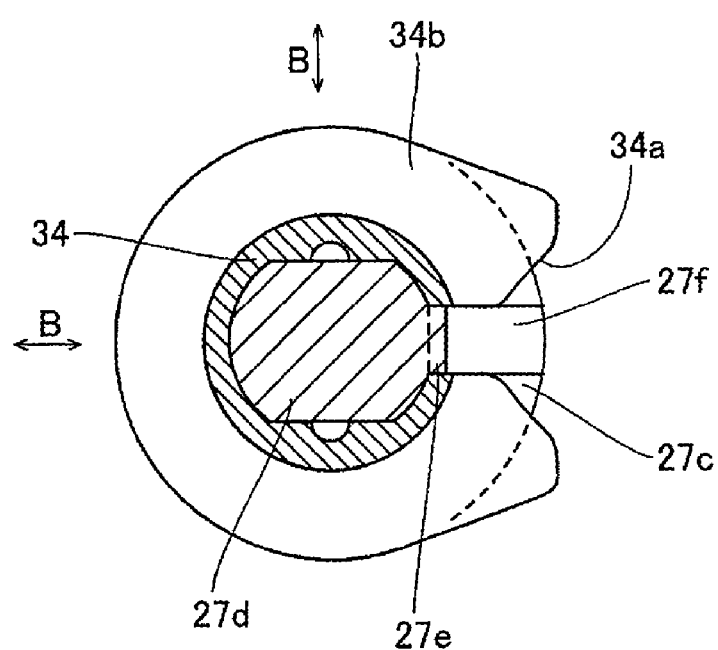

[FIG. 23]
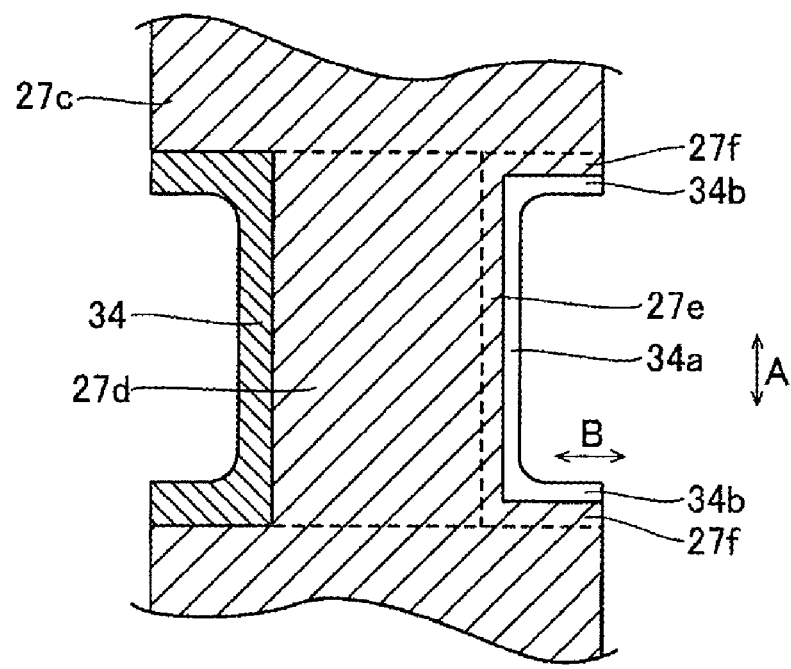

[FIG. 24]
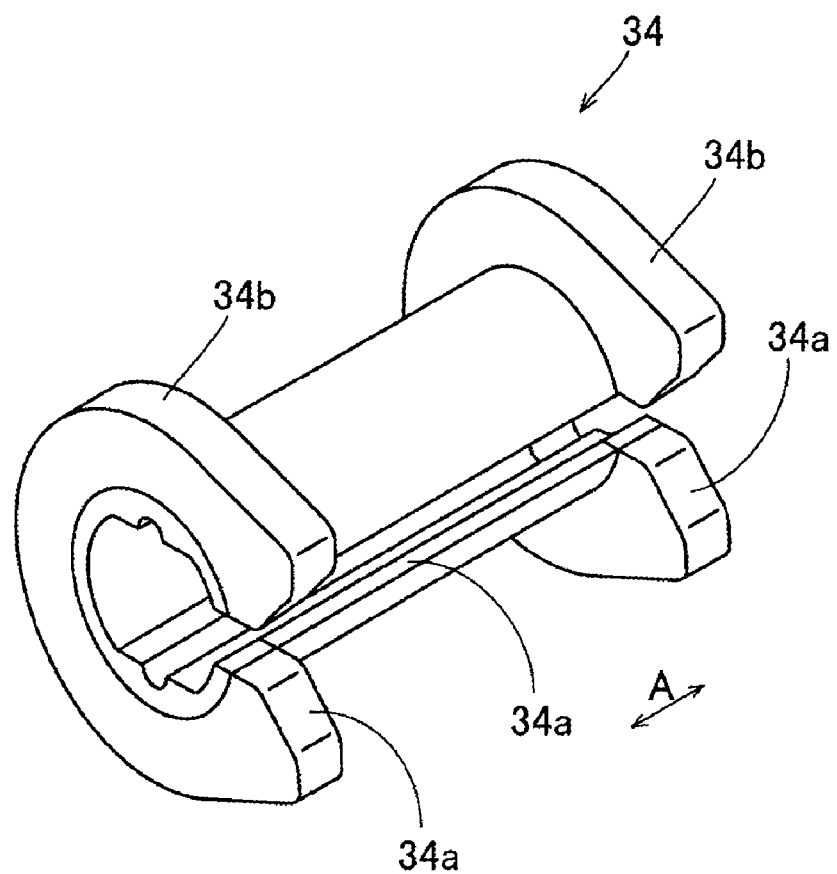

[FIG. 25]
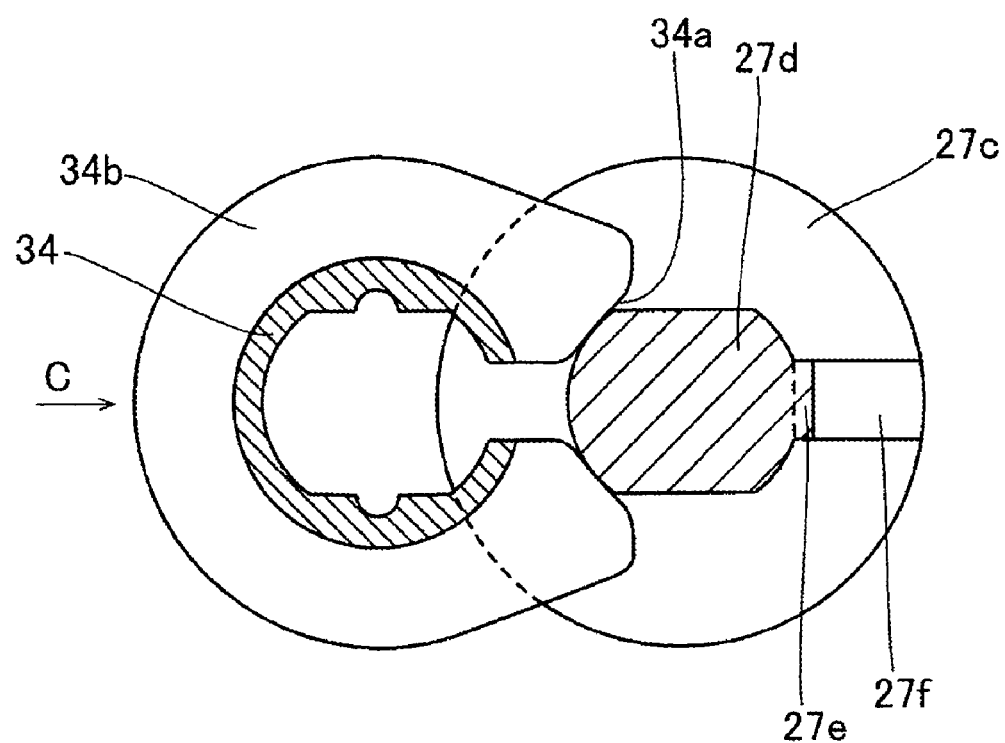

[FIG. 26]
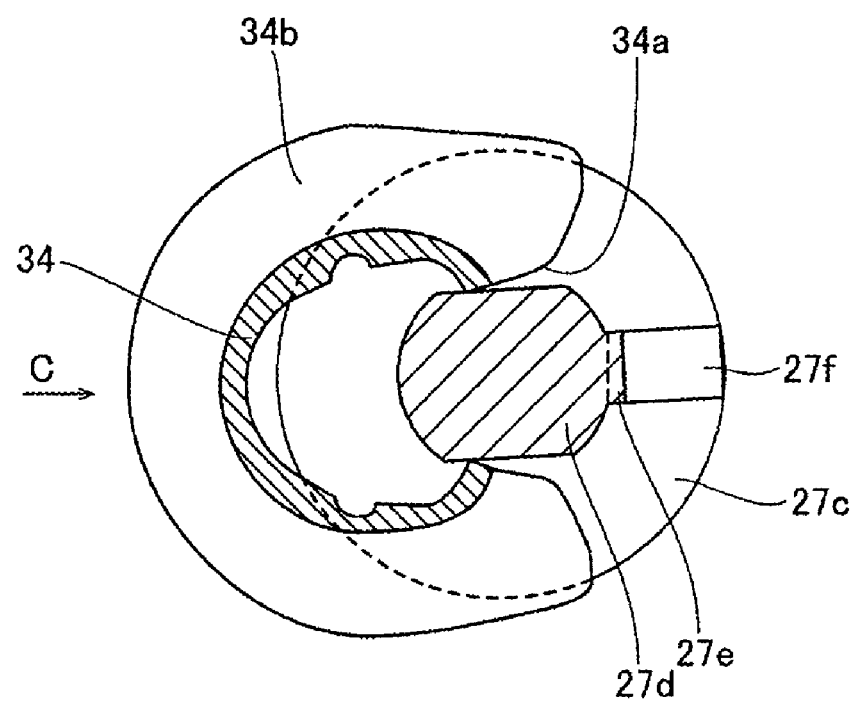

[FIG. 27]
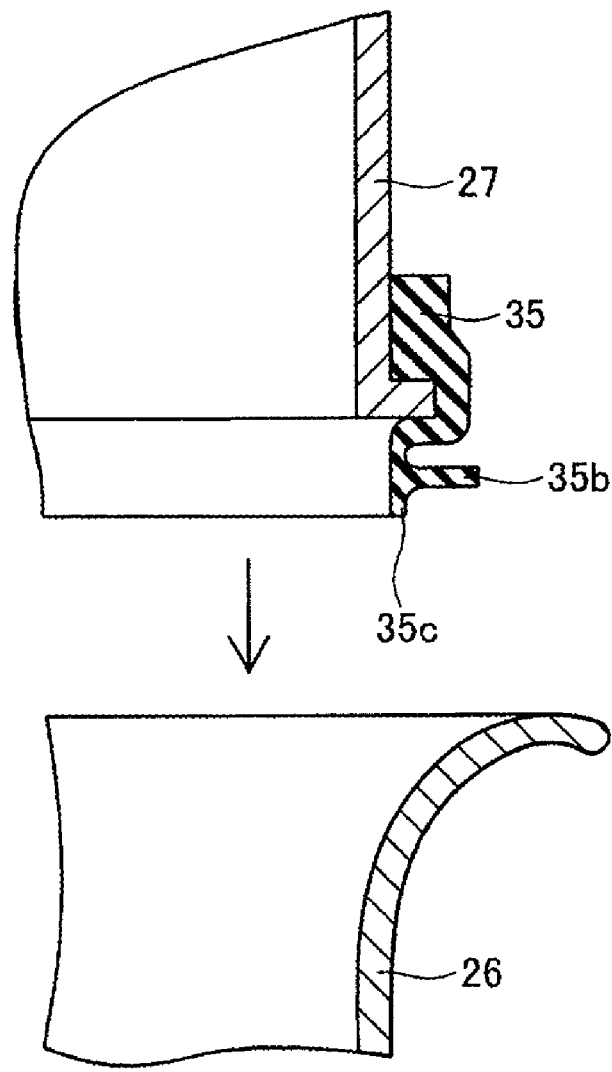

[FIG. 28]
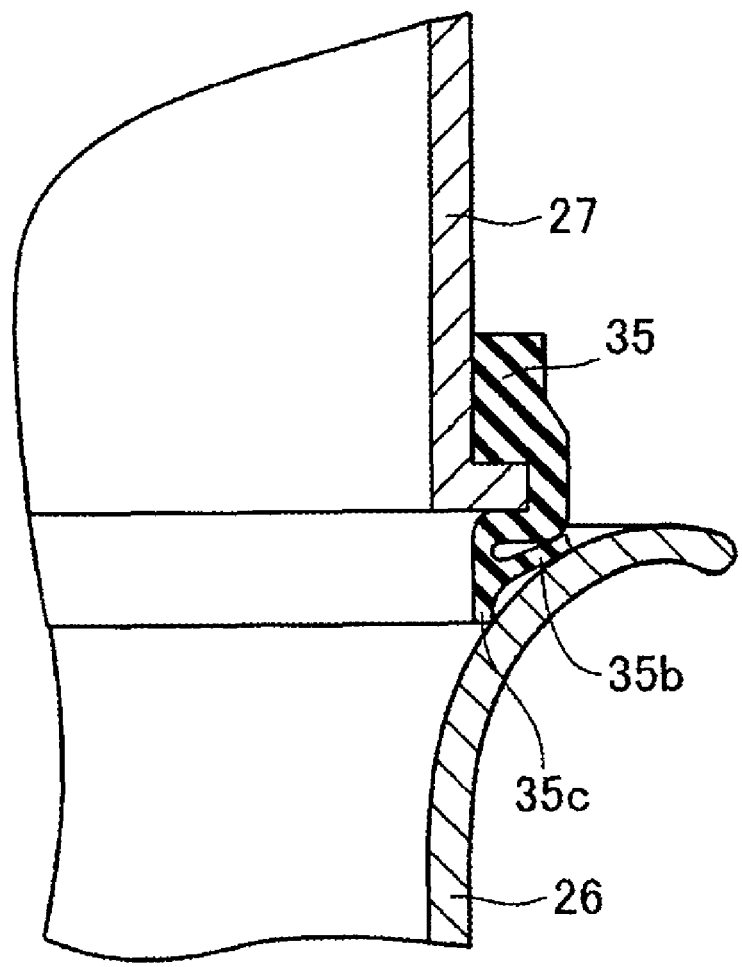

[FIG. 29]
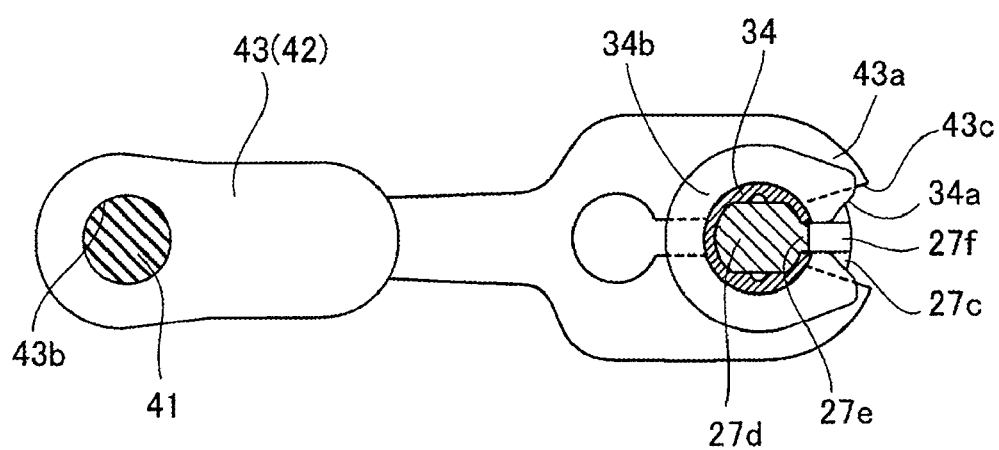

[FIG. 30]
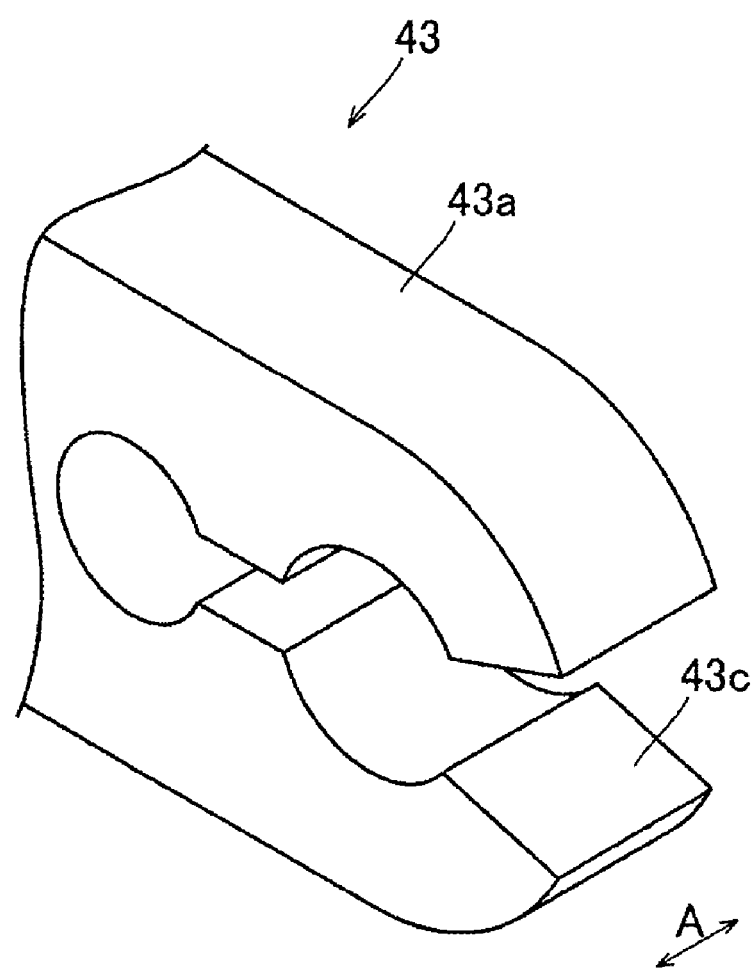

[FIG. 31]
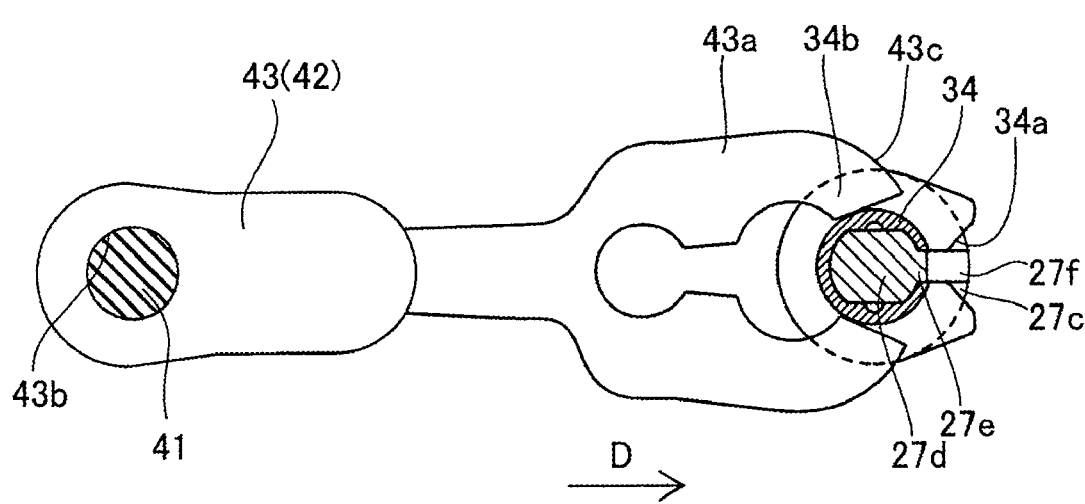

[FIG. 32]
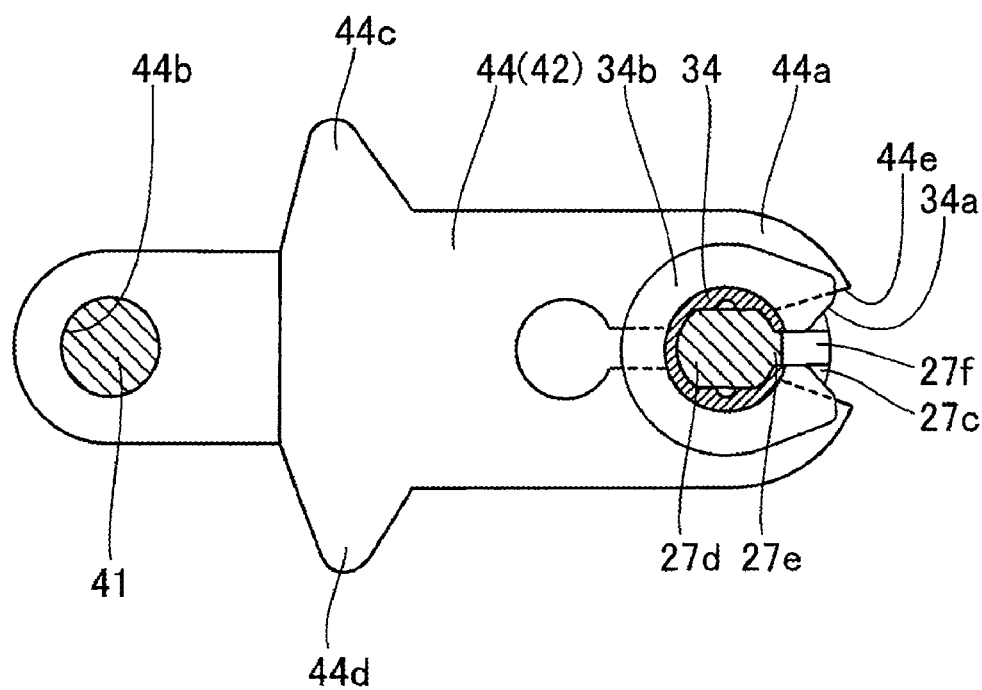

[FIG. 33]
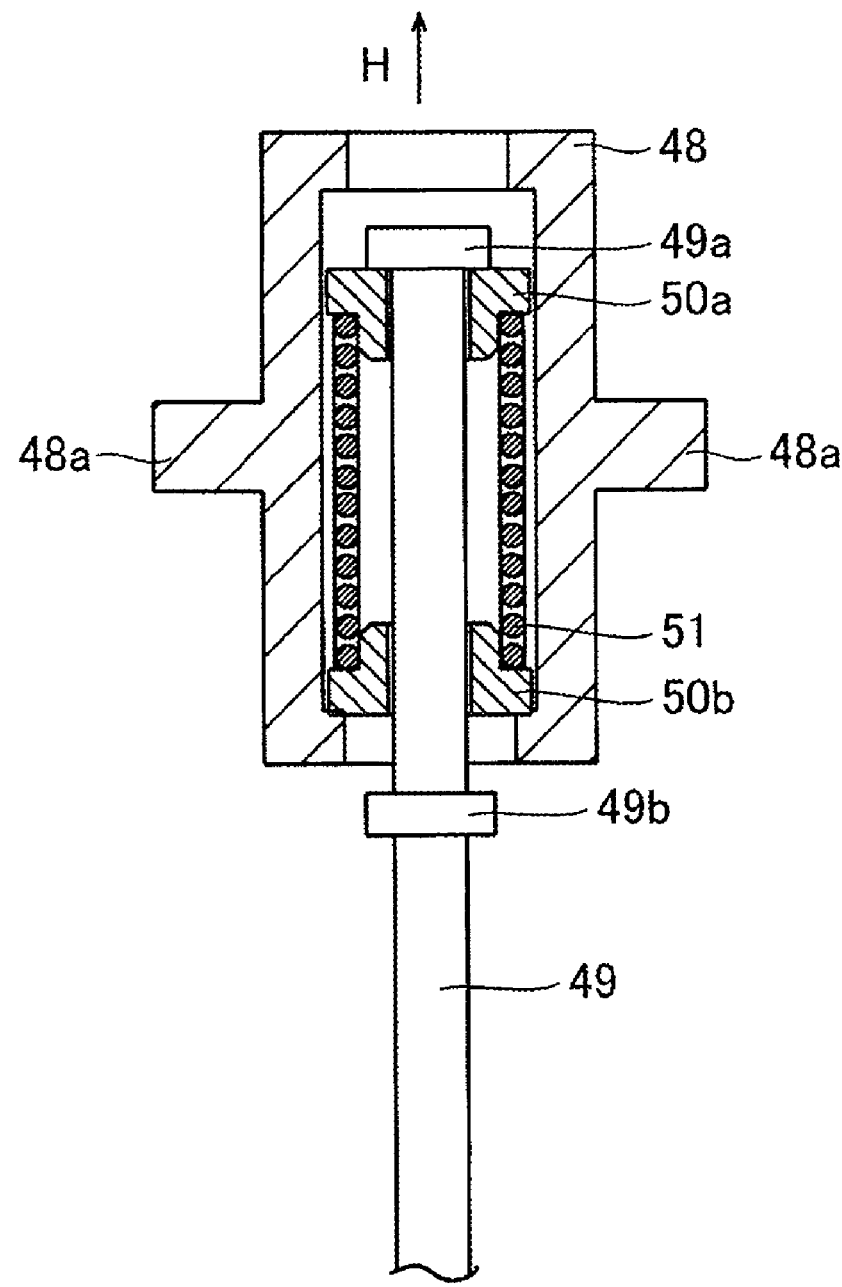

[FIG. 34]
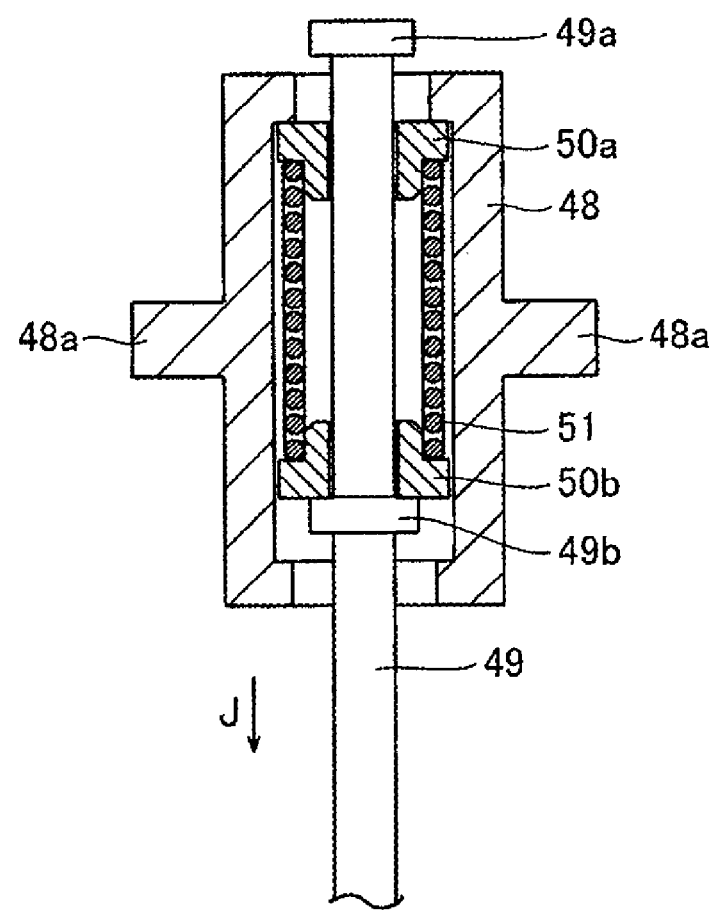

VEHICLE WITH VARIABLE AIR INTAKE ARRANGEMENT

RELATED APPLICATIONS

This application is related to, and claims priority from, Japanese Patent Application Nos. 2006-253649, filed Sep. 20, 2006, and 2006-111560, filed Apr. 14, 2006, each entitled "VEHICLE." The entireties of these applications are hereby incorporated by reference herein and made a part of the present specification.

BACKGROUND OF THE INVENTION

1. Field of the Invention

The present invention relates to a vehicle, and more particularly to a vehicle having a variable length air intake arrangement for introducing air to an intake port of an engine.

2. Description of the Related Art

Some vehicles incorporate a variable length air intake system. For example, a variable length air intake system shown in Japanese Patent Publication No. 63-182229 includes a stationary funnel for introducing air to an intake port of an engine, a movable funnel movably disposed on the air inlet side of the stationary funnel. A rotary arm is positioned on one side of the movable funnel and is attached to the movable funnel. A rotary shaft is positioned on the same side of the movable funnel and is coupled to the rotary arm. A motor is also positioned on the same side of the movable funnel as the rotary arm and shaft, and is configured to drive the rotary arm. In this intake system, the rotary arm is moved rotationally about the rotary shaft by the driving force of the motor, so that the movable funnel attached to the rotary arm can move relative to the stationary funnel to vary a length of the intake system.

SUMMARY OF THE INVENTION

An aspect of the present invention involves the realization that the intake system disclosed in Japanese Patent Publication No. 63-182229 makes it difficult to achieve an efficient layout of the intake system components and the associated vehicle structures because the motor and the rotary arm are provided on the same said of the intake funnel and, more particularly, of the movable funnel. As a result, space for the motor must be provided around the rotary arm. At least some of the preferred embodiments address the foregoing problem. Accordingly, an aspect of at least one preferred embodiment of the invention is a vehicle having a simplified structure of a linkage mechanism for moving a movable funnel of an air intake system and the surrounding area of the linkage mechanism.

One aspect of a preferred embodiment involves a vehicle including an engine having an intake port. At least one funnel assembly comprises a stationary funnel for introducing air to the intake port of the engine and a movable funnel located on an inlet side of the stationary funnel for introducing the air to the intake port of the engine in cooperation with the stationary funnel. A linkage mechanism movably supports the movable funnel and a drive source drives the linkage mechanism to move the movable funnel. The linkage mechanism and the drive source are arranged generally on opposite sides of the movable funnel. As described above, because the drive source for driving the linkage mechanism is located on the opposite side of the movable funnel from the linkage mechanism, it is not necessary to provide a space to accommodate the drive source around the linkage mechanism. With such a construction, the area surrounding the linkage mechanism can be simplified.

Another aspect of a preferred embodiment involves a vehicle as described above, wherein the linkage mechanism is located on one of a front or rear side of the movable funnel in a longitudinal direction of the vehicle and the drive source is located on an opposite side of the linkage mechanism with respect to the movable funnel in the longitudinal direction of the vehicle. With such a construction, the linkage mechanism and the drive source are not arranged in the vehicle width direction, and hence an increase in vehicle width can be avoided.

Another aspect of a preferred embodiment involves a vehicle as described above, wherein the stationary funnel and the movable funnel are positioned within a housing. The linkage mechanism is located inside the housing and the drive source is located outside of the housing. With such an arrangement, because the drive source is not located in the path of air supplied to the stationary funnel (and intake passage), the flow of air can be smoothly supplied to the stationary funnel.

Still another aspect of a preferred embodiment involves a vehicle as described above, wherein the linkage mechanism is positioned on an upstream side of the movable funnel relative to a flow of intake air within the housing. With this arrangement, because the linkage mechanism is not disposed on the side opposite to the air supply side, disturbance of air flow by the link mechanism can be reduced. Thus, air can be smoothly supplied to the movable funnel and the stationary funnel. The term "side" as used herein is intended to refer not only to transverse (left and right) directions of the vehicle but also to longitudinal directions and oblique directions between the longitudinal and transverse directions, and hence should be interpreted broadly. In one arrangement, the direction of air flow is generally aligned with a fore and aft direction of the vehicle. With such an arrangement, the air passage (intake passage) is not disposed in the vehicle width direction, and hence an increase in vehicle width can be avoided.

Another aspect of a preferred embodiment involves a vehicle as described above, wherein with the at least one funnel assembly comprises a plurality of funnel assemblies. The vehicle further includes a transmission shaft that transmits a driving force from the drive source to the linkage mechanism. The drive shaft passes through a space between a first end and a second end of the plurality of funnel assemblies. Preferably, the drive shaft passes between a pair of the plurality of funnel assemblies. With such an arrangement, because the plurality of movable funnels can be driven by the one transmission shaft, an increase in number of parts for driving the movable funnels can be avoided. Thus, enlargement of the surrounding area of the linkage mechanism can be avoided.

Yet another aspect of a preferred embodiment involves a vehicle as described above, wherein the linkage mechanism includes a first linkage member supporting the movable funnel and fixed for rotation with a rotary shaft. Rotation of the rotary shaft moves the first linkage member thereby moving the movable funnel. With such a construction, the movable funnel can be easily separated from, and brought into contact with, the stationary funnel.

Still another aspect of a preferred embodiment involves a vehicle as described above, wherein the linkage mechanism is a parallel linkage that moves the movable funnel along a substantially linear path. With this arrangement, by using the parallel link to move the movable funnel, the outlet opening of the movable funnel can be separated from, and brought into contact with, the inlet opening of the stationary funnel with the outlet opening end of the movable funnel held parallel to the inlet opening end of the stationary funnel. Thus, even when the outlet opening of the movable funnel is spaced apart from the inlet opening of the stationary funnel, air can flow linearly through the movable funnel into the stationary funnel, and hence an increase in air flow resistance can be avoided. As a result, a decrease in air intake efficiency can be avoided when the movable funnel is separated from the stationary funnel.

Another aspect of a preferred embodiment involves a vehicle as described above, wherein a first fuel injection system positioned downstream from the stationary funnel and a second fuel injection system positioned upstream from, and preferably above, the movable funnel. With this construction, because the second fuel injection system is spaced from the intake port, it is possible to extend the time for fuel injected from the second fuel injection system to be supplied into the intake port. Thus, when the engine operates at a high speed, and the flow rate of air to be taken into the intake port is high, more of the fuel injected from the second fuel injection system can be atomized and vaporized and then supplied to the intake port. As a result, the combustion efficiency can be made more optimal. In addition, the temperature of the air-fuel mixture in the intake passage can be lowered by the effect of vaporization cooling due to the atomization and vaporization of more fuel. Thus, the density of the air-fuel mixture in the intake passage can be increased. In this way, the amount of the air-fuel mixture to be taken into the intake port can be increased, thereby improving the charging efficiency. In one arrangement, a fuel injection port of the second fuel injection system is disposed so as to be in an air passage of the movable funnel when the movable funnel is separated from the stationary funnel. With such an arrangement, fuel injected from the fuel injection port of the second fuel injection system can be prevented from being directed out of the movable funnel.

Another aspect of a preferred embodiment involves a vehicle as described above, wherein the at least one funnel assembly comprises a plurality of funnel assemblies. The vehicle further comprises a positioning member that defines at least a first position for locating at least a first of the plurality of stationary funnels and a second position for locating at least a second of the plurality of stationary funnels. With such an arrangement, the plurality of stationary funnels can be positioned in the predetermined positions.

Yet another aspect of a preferred embodiment involves a vehicle as described above, wherein the stationary funnels and the movable funnels are positioned in a housing in the form of an air cleaner box. A filter is secured to the air cleaner box for filtering the inlet air. The positioning member further functions as a guide for positioning the filter relative to the air cleaner box. With such an arrangement, the filter can be easily attached to the air cleaner box with the plurality of stationary funnels disposed in the predetermined positions.

Still another aspect of a preferred embodiment involves a vehicle as described above, wherein a housing in the form of an air cleaner box houses the funnel assembly. A filter is secured to the air cleaner box for filtering inlet air. A guide member guides the positioning of the filter relative to the air cleaner box. With this construction, the filter can be easily attached to the air cleaner box.

Another aspect of a preferred embodiment involves a vehicle as described above, further including a seal member disposed between the stationary funnel and the movable funnel. With this construction, air leakage through the gap between the movable funnel and the stationary funnel can be reduced or eliminated when the movable funnel is in contact with the stationary funnel.

BRIEF DESCRIPTION OF THE DRAWINGS

These and other features, aspects and advantages of the present invention are described below with reference to drawings of a preferred embodiment, which is intended to illustrate, but not to limit, the present invention. The drawings contain thirty-four (34) figures.

FIG. 1 is a side view of a motorcycle having certain features, aspects and advantages of the present invention.

FIG. 2 is a plan view of an air intake system and the surrounding area of the motorcycle of FIG. 1.

FIG. 3 is a side view of the of the air intake system of FIG. 2, with certain components, such as an air cleaner box and air filter, shown in cross section and other components shown in dashed line.

FIG. 4 is a cross sectional view of an attachment structure of the air filter to the air cleaner box.

FIG. 5 is a side view of a portion of the air cleaner box of the motorcycle of FIG. 1.

FIG. 6 is a side view of the air cleaner box and a funnel moving mechanism secured to the air cleaner box.

FIG. 7 is a front view of the air intake system of the motorcycle of FIG. 1.

FIG. 8 is a perspective view of a portion of the air intake system, with a plurality of movable funnels in separated positions from a plurality of stationary funnels.

FIG. 9 is a side view of a portion of the intake system including a stationary funnel, a movable funnel, and the funnel moving mechanism.

FIG. 10 is a side view of a parallel linkage of the intake system with the movable funnels separated from the stationary funnels.

FIG. 11 is a perspective view with the movable funnels in a position contacting the stationary funnels.

FIG. 12 is a side view of the air intake system with the movable funnels in the position contacting the stationary funnels.

FIG. 13 is a side view of the parallel linkage with the movable funnels in the position contacting the stationary funnels.

FIG. 14 is a plan view of the air intake system of the motorcycle of FIG. 1.

FIG. 15 is a front view of stationary funnels of the motorcycle of FIG. 1.

FIG. 16 is a cross sectional view of an attachment structure of the stationary funnels shown in FIG. 15 to a throttle body.

FIG. 17 is a cross sectional view of the attachment structure of FIG. 16 with the components separated from one another.

FIG. 18 is an enlarged cross sectional view of a guide member and the surrounding area of the motorcycle of FIG. 1.

FIG. 19 is another front view of the movable funnels of the motorcycle of FIG. 1.

FIG. 20 is a perspective view of a support shaft for the movable funnels shown in FIG. 19.

FIG. 21 is a plan view of the support shaft shown in FIG. 20.

FIG. 22 is a side, partial cross sectional view of the support shaft and a split bushing for use in the motorcycle of FIG. 1.

FIG. 23 is a cross sectional view of the split bushing and portion of the support shaft shown in FIG. 22.

FIG. 24 is a perspective view of the split bushing of FIGS. 22 and 23.

FIG. 25 is a side view illustrating the assembly of the split bushing onto the support shaft.

FIG. 26 is a side view of the assembly of the split bushing onto the support shaft, with the split bushing in a different position relative to the support shaft than that shown in FIG. 25.

FIG. 27 is a cross sectional view of a structure of a seal member between the stationary funnels and the movable funnels.

FIG. 28 is a cross sectional view of the seal member of FIG. 27 with the stationary funnels contacting the movable funnels.

FIG. 29 is a side view of area portion of the parallel linkage of the air intake system.

FIG. 30 is a perspective view of a fitting part of the parallel linkage shown in FIG. 29.

FIG. 31 is a side view of the assembly of the parallel linkage to a support shaft supporting the movable funnels.

FIG. 32 is a side view of a portion of the parallel linkage assembled to a support shaft supporting the movable funnels.

FIG. 33 is a cross sectional view of a movable member for driving the rotating shaft supporting the movable funnels.

FIG. 34 is a cross sectional view of the movable member of FIG. 33 in another position.

DETAILED DESCRIPTION OF THE PREFERRED EMBODIMENTS

FIG. 1 is a side view showing a motorcycle having certain features, aspects and advantages of the present invention. FIGS. 2 to 34 illustrate a detailed structure of an air intake system including a funnel assembly of the motorcycle shown in FIG. 1. In the description of this embodiment, a motorcycle is taken as an example of the vehicle of the present invention. However, aspects of the preferred embodiments may be applied to other vehicles as well. In the drawings, "FWD" indicates the forward or running direction of the motorcycle. The structure of the motorcycle is described with reference to FIGS. 1 to 34.

As shown in FIG. 1, the motorcycle has a head pipe 1 and a main frame 2 with its front end connected to the head pipe 1. As shown in FIG. 2, the main frame 2 is branched to extend leftward and rightward with respect to the forward direction of the vehicle body (FWD direction indicated by the arrow). The main frame 2 is provided with an air intake passage 2a for introducing air into an air cleaner box 24 that is described later. As shown in FIG. 1, the main frame 2 is formed to extend rearward and downward. A seat rail 3 extending rearward and upward is connected to the main frame 2. A steering mechanism 4 is attached to the head pipe 1 for rotational movement. Handlebars 5 are attached to an upper part of the steering mechanism 4. A clutch lever 6 is attached to the handlebars 5. A front fork 7 is attached to a lower part of the steering mechanism 4. A front wheel 8 is rotatably mounted at the lower end of the front fork 7.

The front end of a swing arm 10 is attached to the rear end of the main frame 2 via a pivot shaft 9. A rear wheel 11 is rotatably mounted at the rear end of the swing arm 10. A fuel tank 12 is disposed above the main frame 2, and a seat 13 is disposed above the seat rail 3. An engine 14 is mounted below the main frame 2.

As shown in FIG. 3, the engine 14 includes a piston 15, a cylinder 16, a cylinder head 17 and a throttle body 18. The piston 15 is fitted in the cylinder 16, and the cylinder head 17 is disposed to close one opening of the cylinder 16. The cylinder head 17 is formed with an intake port 17a and an exhaust port 17b. The intake port 17a is provided to supply a mixture of air and fuel to a combustion chamber 16a of the cylinder 16. The exhaust port 17b is provided to exhaust a residual gas from the combustion chamber 16a of the cylinder 16 after combustion. The intake port 17a and the exhaust port 17b are provided with an intake valve 19a and an exhaust valve 19b, respectively. The throttle body 18 is attached to an opening of the intake port 17a. An injector 20 for injecting fuel into the intake port 17a is attached to the throttle body 18. The injector 20 is an example of the "first fuel injection system" of the present invention; however, other suitable types of fuel injection mechanisms may be used. An exhaust pipe 21 is attached to an opening of the exhaust port 17b, and a muffler 22 (see FIG. 1) is connected to the exhaust pipe 21. Although only one cylinder 16 is shown in FIG. 3, multiple cylinders may be provided. In the illustrated motorcycle, four cylinders 16 are actually provided at predetermined intervals in the width direction of the vehicle body. That is, the engine 14 of this embodiment is a four-cylinder type.

As shown in FIG. 1, the front side of the vehicle body is covered by a front cowl 23, which includes an upper cowl 23a and a lower cowl 23b. As shown in FIGS. 1 and 2, an air cleaner box 24 for receiving air supplied from the air intake passage 2a of the main frame 2 is disposed between the left and right branches of the main frame 2. The air cleaner box 24 is an example of the "casing" and the "housing" of the present invention. As shown in FIGS. 2 and 3, an air filter 25 is disposed in the air cleaner box 24 to filter air supplied from the air intake passage 2a of the main frame 2. The air filter 25 is an example of the "filter" of the present invention. As shown in FIG. 3, the air filter 25 is secured by being interposed between an upper box part 24a and a lower box part 24b of the air cleaner box 24. Specifically, as shown in FIG. 3, the front part of the air filter 25 is secured by being interposed by a pressing part 24c of the upper box part 24a and a support part 24d of the lower box part 24b. As shown in FIGS. 2 and 4, the longitudinal center of the air filter 25 is screwed with a screw 60 (see FIG. 4) to a screw hole 24e (see FIG. 4) of the upper box part 24a and a screw hole 24f of the lower box part 24b. As shown in FIG. 3, a contacting portion 25a at the rear part of the air filter 25 is secured by being interposed between a guide member 31 described below and the lower box part 24b.

In this embodiment, as shown in FIGS. 3 and 7, a stationary funnel 26 and a movable funnel 27 are provided in the air cleaner box 24. As shown in FIG. 3, an injector 28 is attached to an upper part of the air cleaner box 24. The injector 28 is an example of the "second fuel injection system" of the present invention. The injector 28 is provided to inject fuel into the intake port 17a, together with the injector 20, when the engine 14 is rotating at high speeds. The injector 28 is disposed above, and upstream from, the movable funnel 27.

In this embodiment, a fuel injection part 28a of the injector 28 is disposed so as to be in an air passageway 27a of the movable funnel 27 when the movable funnel 27 is spaced apart or separated from the stationary funnel 26 (as shown in FIGS. 9 and 10), and is disposed so as to be above the movable funnel 27 when the movable funnel 27 is in contact with the stationary funnel 26 (as shown in FIGS. 12 and 13).

As shown in FIG. 5, a projection 24j is formed at a rear part of the air cleaner box 24. The projection 24j is formed together with a plate 24i having an opening 24g and three screw holes 24h by insert molding. As shown in FIG. 6, a funnel moving mechanism 29 is screwed to the screw holes 24j of the air cleaner box 24 from the outside.

As shown in FIG. 3, in the illustrated embodiment, one stationary funnel 26 and one movable funnel 27 are provided for each cylinder 16 of the engine 14. The stationary funnel 26 is secured to the air cleaner box 24, and has a function of introducing filtered air in the air cleaner box 24 to the intake port 17*a*. The movable funnel 27 is disposed on the air supply side, or inlet side, of the stationary funnel 26, and has a function of introducing filtered air in the air cleaner box 24 to the intake port 17*a*, in cooperation with the stationary funnel 26.

As shown in FIGS. 8 to 13, the movable funnel 27 is translatable between the spaced position (shown in FIGS. 8 to 10) at which its opening 27*b* on the stationary funnel 26 side is spaced apart from an opening 26*a* of the stationary funnel 26 on the inlet side, and the contacting position (shown in FIGS. 1 to 13) at which the opening 27*b* of the movable funnel 27 is in contact with the opening 26*a* of the stationary funnel 26. Here, as shown in FIG. 3, when the movable funnel 27 is in the spaced position (shown in FIGS. 8 to 10), the intake pipe extending from the air cleaner box 24 to the cylinder 16 is made up of the stationary funnel 26, the throttle body 18 and the intake port 17*a*. On the other hand, when the movable funnel 27 is in the contacting position (shown in FIGS. 11 to 13), the intake pipe extending from the air cleaner box 24 to the cylinder 16 is made up of the movable funnel 27, the stationary funnel 26, the throttle body 18 and the intake port 17*a*.

As shown in FIGS. 14 and 15, two adjacent stationary funnels 26 are integrated together via a connection 26*b*. That is, this embodiment includes two parts 30, each integrating two adjacent stationary funnels 26 together. As shown in FIG. 14, each part 30, integrating two stationary funnels 26 together, has three screw insertion holes 26*c* for insertion of screws 62 or other suitable fasteners (see FIG. 16). As shown in FIG. 16, the stationary funnels 26 (part 30) are attached to the air cleaner box 24 and the throttle body 18 with the screws 62 inserted into the screw insertion holes 26*c*. The air cleaner box 24 is also formed with screw insertion holes 24*k* for insertion of the screws 62. An engagement portion 26*d* is formed on the inner surface of the screw insertion hole 26*c* of the stationary funnels 26 (part 30). With this construction, as shown in FIG. 17, a head 62*a* of the screw 62 can be engaged with the engagement portion 26*d* before the screw 62 is attached to the throttle body 18. Thus, the screw 62 can be prevented from slipping upward out of the screw insertion hole 26*c*. As shown FIGS. 14 and 15, a support column 26*e* is formed integrally with the part 30 integrating two stationary funnels 26 together. As shown in FIG. 15, the support column 26*e* is formed with a pair of rotary shaft support holes 26*f* for supporting ends of rotary shafts 41 (described below) for rotational movement.

In this embodiment, as shown in FIG. 8, a guide member 31 is attached to the support columns 26*e* of the two parts 30. The guide member 31 is an example of the "positioning member" and the "guide member" of the present invention. A fixation part 31*b* having a fixation hole 31*a* is provided at both ends of the guide member 31. As shown in FIG. 14, the guide member 31 is screwed at the fixation holes 31*a* (see FIG. 8) to the air cleaner box 24 (see FIG. 2) with screws 63. As shown in FIGS. 8 and 14, the fixation parts 31*b* are each formed with a cylindrical portion 31*c* projecting upward. As shown in FIG. 18, the cylindrical portions 31*c* formed at both ends of the guide member 31 are respectively inserted into insertion holes 26*g* of the support columns 26*e* of the part 30 via rubber members or grommets 32. That is, the guide member 31 has a function of regulating the attachment positions of the two parts 30. With this construction, changes in the interval between the two parts 30 in the axial direction of the guide member 31 can be avoided.

In this embodiment, as shown in FIG. 3, the guide member 31 functions as a guide when attaching the air filter 25 to the air cleaner box 24. Specifically, the air filter 25 can be attached to the air cleaner box 24 by holding the air filter 25 with the contacting portion 25*a* (e.g. a hook or hook-shaped portion) at the rear part thereof in contact with a cylindrical portion of the guide member 31 and then rotating the air filter 25 about the guide member 31 in P direction of FIG. 3. The guide member 31 also has a function of preventing the rear part of the air filter 25 from coming upward out of position when the air filter 25 is attached to the air cleaner box 24.

In this embodiment, as shown in FIGS. 14 and 19, two adjacent movable funnels 27 are integrated together via a pair of support shafts 27*c* (see FIG. 19). That is, this embodiment includes two parts 33, each integrating two adjacent movable funnels 27 together. The support shaft 27*c* is disposed between the two movable funnels 27 of the part 33. The support shaft 27*c* is supported by a parallel linkage 42 described below so that the movable funnels 27 (part 33) are translatable, or movable substantially along a straight line. With this structure, two movable funnels 27 can be translatably supported by one parallel linkage 42. Thus, the number of parallel links 42 can be reduced compared to the case where a parallel linkage 42 is provided for each movable funnel 27. As shown in FIG. 19, the support shaft 27*c* has a small diameter portion 27*d* formed with ribs 27*e* and 27*f*. As shown in FIGS. 20 and 21, the rib 27*e* is formed on the outer surface of the small diameter portion 27*d* to extend in the axial direction of the support shaft 27*c* (A direction), and the ribs 27*f* are formed at both ends of the small diameter portion 27*d* to extend in a radial direction of the support shaft 27*c* (B direction).

As shown in FIG. 19, a support shaft 27*h* having a small diameter portion 27*g* is provided on outer sides of the part 33 integrating two adjacent movable funnels 27 together. The small diameter portion 27*g* of the support shaft 27*h* is formed with ribs 27*i* and 27*j*. The ribs 27*i* and 27*j* are similar in shape to the ribs 27*e* and 27*f* shown in FIGS. 20 and 21, respectively. That is, the rib 27*i* is formed on the outer surface of the small diameter portion 27*g* to extend in the axial direction of the support shaft 27*h*, and the rib 27*j* is formed at an end of the small diameter portion 27*g* on the movable funnel 27 side to extend in a radial direction of the support shaft 27*h*. As shown in FIG. 14, the two parts 33, each integrating two movable funnels 27 together, are disposed such that their respective end surfaces of the small diameter portions 27*g* of the support shafts 27*h* are opposed to each other.

In this embodiment, as shown in FIGS. 22 and 23, a split bushing 34 is mounted on the small diameter portion 27*d* of the support shaft 27*c* of the movable funnels 27 (part 33). The split bushing 34 has a function of allowing rotational movement of the parallel linkage 42 described below relative to the support shaft 27*c*. As shown in FIGS. 22 to 24, the split bushing 34 has a split portion 34*a* extending in the axial direction of the support shaft 27*c* (see FIGS. 22 and 23) (A direction). The split bushing 34 is elastically deformable so that the split width of the split portion 34*a* can be enlarged. A flange 34*b* is provided at both ends of the split bushing 34 that projects in a radial direction of the support shaft 27*c* (B direction). The flange 34*b* is integrally provided with a split portion 34*a*. The split portion 34*a* in the flange 34*b* is shaped such that its split width becomes gradually larger along the projecting direction of the flange 34*b*. With the split bushing 34 constructed as described above, the flange 34*b* of the split bushing 34 is held in contact with the small diameter portion 27*d* of the support shaft 27*c* (as shown in FIG. 25), and then pushed in C direction to obtain the state shown in FIG. 26, where the split portion 34a of the split bushing 34 catches the small diameter portion 27d of the support shaft 27c therein. Then, by further pushing the split bushing 34 in C direction from the state of FIG. 26, the split bushing 34 can be mounted on the small diameter portion 27d of the support shaft 27c as shown in FIG. 22.

As shown in FIGS. 22 and 23, when the split bushing 34 is mounted on the small diameter portion 27d of the support shaft 27c, the split portion 34a of the split bushing 34 is in engagement with the rib 27e of the support shaft 27c by catching the rib 27e therein and the split portion 34a in the flange 34b is in engagement with the rib 27f of the support shaft 27c by catching the rib 27f therein.

As shown in FIG. 14, such a split bushing 34 as described above is also mounted on the small diameter portions 27g of the support shafts disposed 27h between the two parts 33, each integrating two movable funnels 27 together. Between the two parts 33 each integrating two movable funnels 27 together, only one split bushing 34 is mounted in such a manner as to cover the two small diameter portions 27g of the support shafts 27h.

In this embodiment, as shown in FIGS. 7 and 9, a seal member 35 is mounted at the lower end of the movable funnel 27, which is on the stationary funnel 26 side. The seal member 35 is annular in shape and is made of rubber. However, other suitable materials and shapes may be used. As shown in FIG. 19, the seal member 35 is formed with four engagement holes 35a. The seal member 35 can be prevented from slipping off downward from the lower end of the movable funnel 27 by engagement of four projections 27k of the movable funnel 27 with the engagement holes 35a. As shown in FIG. 27, the seal member 35 is formed with a first seal portion 35b extending laterally and a second seal portion 35c extending downward. When the movable funnel 27 translates from the spaced position (shown in FIG. 27) to the contacting position (shown in FIG. 28), the first seal portion 35b comes into contact with the stationary funnel 26 to block the gap between the movable funnel 27 and the stationary funnel 26. Also, the first seal portion 35b is elastically deformed upward so that the second seal portion 35c also comes into contact with the stationary funnel 26 to block the gap between the movable funnel 27 and the stationary funnel 26. That is, the seal member 35 has a double seal structure.

In this embodiment, as shown in FIGS. 9 and 12, the funnel moving mechanism 29 uses a parallel linkage 42 to be described later to translate the movable funnel 27 between the spaced position (shown in FIGS. 8 and 9) and the contacting position (shown in FIGS. 11 and 12).

In a specific structure of the funnel moving mechanism 29, as shown in FIGS. 8 and 14, an end of the rotary shaft 41 is rotatably supported by the rotary shaft support hole 26f (see FIG. 15) of the support column 26e provided to the stationary funnels 26 (part 30). In this embodiment, as shown in FIG. 9, the rotary shaft 41 is disposed on the front side of the movable funnel 27 in the running direction of the vehicle (FWD direction indicated by the arrow). The rotary shaft 41 is an example of the "linkage mechanism" of the present invention. As shown in FIG. 15, one and the other ends of the rotary shaft 41 are each formed with a stepped portion 41a, which is in contact with the opening edge of the rotary shaft support hole 26f of the support column 26e. Thus, axial movement of the rotary shaft 41 is regulated.

As shown in FIG. 14, a parallel linkage 42 is attached to the one and the other ends of the rotary shaft 41 so as to move rotationally together therewith. The parallel linkage 42 is an example of the "linkage mechanism" of the present invention. As shown in FIGS. 8 and 10, the parallel linkage 42 includes an upper linkage member, or link lever 43 attached to the upper rotary shaft 41 for rotational movement thereabout and a lower linkage member, or link lever 44 attached to the lower rotary shaft 41 for rotational movement thereabout. The upper link lever 43 and the lower link lever 44 are examples of the "linkage mechanism" and the "linkage members" of the present invention.

As shown in FIG. 29, the upper link lever 43 has a fitting part 43a and a rotary shaft insertion hole 43b. As shown in FIGS. 8 and 10, the fitting part 43a of the upper link lever 43 receives the upper support shaft 27c (small diameter portion 27d) of the movable funnel 27 via the split bushing 34. With this construction, the upper link lever 43 is rotationally movable relative to the upper support shaft 27c. As shown in FIGS. 29 and 30, the fitting part 43a has a split portion 43c extending in the axial direction of the support shaft 27c (A direction). The fitting part 43a is elastically deformable so that the split width of the split portion 43c can be enlarged. With the fitting part 43a constructed as described above, the split portion 43c of the fitting part 43a is pushed against the split bushing 34 (support shaft 27c) in D direction to obtain the state shown in FIG. 31, where the split portion 43c of the fitting part 43a catches the split bushing 34 (support shaft 27c) therein. Then, by further pushing the fitting part 43a in D direction from the state shown in FIG. 31, the fitting part 43a can be fitted on the split bushing 34 (support shaft 27c) as shown in FIG. 29.

As shown in FIGS. 10 and 13, the upper rotary shaft 41 is inserted into the rotary shaft insertion hole 43b of the upper link lever 43 so that the upper link lever 43 moves rotationally together with the upper rotary shaft 41. As shown in FIG. 14, a link lever 43d is disposed between the parts 33 each integrating two movable funnels 27. The link lever 43d has a fitting part 43a (see FIGS. 9 and 12), a rotary shaft insertion hole 43b and a split portion 43c similar to those of the upper link lever 43.

As shown in FIG. 32, the lower link lever 44 has a fitting part 44a, a rotary shaft insertion hole 44b and two stoppers 44c and 44d. The fitting part 44a of the lower link lever 44 receives the lower support shaft 27c (small diameter portion 27d) of the movable funnel 27 via the split bushing 34. With this construction, the lower link lever 44 is rotationally movable relative to the lower support shaft 27c. The fitting part 44a has a split portion 44e extending in the axial direction of the support shaft 27c. The fitting part 44a is elastically deformable so that the split width of the split portion 44e can be made larger. The split portion 44e has a function similar to that of the split portion 43c of the upper link lever 43 described above. The lower rotary shaft 41 is inserted into the rotary shaft insertion hole 44b of the lower link lever 44 so that the lower link lever 44 rotates together with the lower rotary shaft 41. As shown in FIG. 10, the stopper 44c of the lower link lever 44 has a function of regulating rotational movement of the lower link lever 44 in E direction by coming into contact with the support column 26e of the stationary funnel 26 when the lower link lever 44 has moved rotationally by a predetermined amount in E direction (when the movable funnel 27 has reached the spaced position). Also, as shown in FIG. 13, the stopper 44d of the lower link lever 44 has a function of regulating rotational movement of the lower link lever 44 in F direction by coming into contact with the support column 26e of the stationary funnel 26 when the lower link lever 44 has moved rotationally by a predetermined amount in F direction (when the movable funnel 27 has reached the contacting position).

As shown in FIG. 11, the lower rotary shaft 41 is provided with a support part 45 for rotational movement together therewith. The support part 45 is made up of a pair of holding pieces 45b each formed with a cutout 45a.

With the support part 45 and the parallel linkage 42 constructed as described above, as shown in FIGS. 9 and 10, when the support part 45 (see FIG. 9) is rotationally moved in E direction to rotationally move the parallel linkage 42 (see FIG. 10) in E direction, the movable funnel 27 is translated away from the stationary funnel 26. Also, as shown in FIGS. 12 and 13, when the support part 45 (see FIG. 12) is rotationally moved in F direction to rotationally move the parallel linkage 42 (see FIG. 13) in F direction, the movable funnel 27 is translated closer to the stationary funnel 26. Here, as shown in FIGS. 10 and 13, the amount of rotational movement of the parallel linkage 42 is adjusted such that the position of the outlet opening end of the movable funnel 27 is substantially the same when viewed in the opening direction of the stationary funnel 26 (or along an axis of movement of the movable funnel 27) between when the movable funnel 27 is in the spaced position (shown in FIG. 10) and when it is in the contacting position (shown in FIG. 13). With this construction, even when the opening 27b of the movable funnel 27 is spaced apart from the opening 26a of the stationary funnel 26 while the engine 14 is rotating at high speeds, air can flow linearly through the movable funnel 27 into the stationary funnel 26 and hence an increase in air flow resistance can be prohibited. As a result, a decrease in air intake efficiency can be avoided while the engine 14 is rotating at high speeds (when the movable funnel 27 is spaced apart from the stationary funnel 26).

As shown in FIG. 14, the parallel linkage 42, which includes the upper link lever 43 (see FIG. 8) and the lower link lever 44, is moved rotationally by the driving force of a motor 46 disposed outside the air cleaner box 24 (see FIG. 3). The motor 46 is an example of the "drive source" of the present invention.

Specifically, the motor 46 is disposed on the rear side of the movable funnel 27 in the running direction of the vehicle (FWD direction indicated by the arrow). As shown in FIG. 9, one end of a rotary lever 47 is attached to an output shaft 46a of the motor 46. The other end of the rotary lever 47 is formed with an insertion hole 47a.

As shown in FIG. 3, the rotary lever 47 is disposed inside the air cleaner box 24 (projection 24j) via the opening 24g of the projection 24j of the air cleaner box 24. As shown in FIG. 9, a projection 48a provided on both sides of a movable member 48 is attached to the insertion hole 47a of the rotary lever 47 so as to be pivotable relative to the insertion hole 47a. As shown in FIG. 33, one end of a movable shaft 49 is disposed inside the movable member 48. In this embodiment, only one movable shaft 49 is provided. The movable shaft 49 is an example of the "drive shaft" of the present invention.

In this embodiment, as shown in FIG. 14, the movable shaft 49 is disposed between a first end and a second end of the movable funnels 27 (in a width direction of the motorcycle) and, more specifically, between the two parts 33 (movable funnels 27). As shown in FIG. 33, the movable shaft 49 is provided with an upper pressing part 49a and a lower pressing part 49b at a predetermined interval. Bushings 50a and 50b are provided inside the movable member 48 for slidably supporting the movable shaft 49. The bushings 50a and 50b are disposed between the upper pressing part 49a and the lower pressing part 49b. A compression spring 51 is mounted inside the movable member 48 between the bushings 50a and 50b. As shown in FIG. 9, a support shaft 52 is provided at the other end of the movable shaft 49. The cutout 45a of the support part 45, which moves rotationally together with the rotary shaft 41, is in engagement with the support shaft 52.

When the rotary lever 47 is rotationally moved in G direction (as shown in FIG. 9) by the driving force of the motor 46, as shown in FIG. 33, the movable member 48 moves in H direction to produce urging force in H direction in the compression spring 51, which in turn urges the movable shaft 49 in H direction. Thus, as shown in FIG. 9, the urging force of the compression spring 51 (see FIG. 33) is transmitted via the movable shaft 49, the support part 45 and the rotary shaft 41 to the parallel linkage 42 (see FIG. 10), which in turn moves rotationally in E direction. Also, as shown in FIG. 10, when the stopper 44c of the parallel linkage 42 is in contact with the support column 26e, the urging force of the compression spring 51 (see FIG. 33) is transmitted via the movable shaft 49 to the parallel linkage 42 so that the parallel linkage 42 rotationally moves in E direction. With this construction, when the lower link lever 44 rotationally moves in E direction and the stopper 44c has come into contact with the support column 26e (when the movable funnel 27 has reached the spaced position), the stopper 44c of the lower link lever 44 can be kept in contact with the support column 26e by the urging force of the compression spring 51. Thus, when the movable funnel 27 is to be kept at the spaced position, displacement of the movable funnel 27 from the spaced position can be avoided. In other words, a lost motion mechanism is interposed between the movable shaft 49 and the movable member support part 45.

On the other hand, when the rotary lever 47 is rotationally moved in I direction (as shown in FIG. 12) by the driving force of the motor 46, as shown in FIG. 34, the movable member 48 moves in J direction to produce urging force in J direction in the compression spring 51, which in turn urges the movable shaft 49 in J direction. Thus, as shown in FIG. 12, the urging force of the compression spring 51 (see FIG. 34) is transmitted via the movable shaft 49, the support part 45 and the rotary shaft 41 to the parallel linkage 42 (see FIG. 13), which in turn moves rotationally in F direction. Also, as shown in FIG. 13, when the stopper 44d of the parallel linkage 42 is in contact with the support column 26e, the urging force of the compression spring 51 (see FIG. 34) is transmitted via the movable shaft 49 to the parallel linkage 42 so that the parallel linkage 42 rotationally moves in F direction. With this construction, when the lower link lever 44 rotationally moves in F direction and the stopper 44d has come into contact with the support column 26e (when the movable funnel 27 has reached the contacting position), the stopper 44d of the lower link lever 44 can be kept in contact with the support column 26e by the urging force of the compression spring 51. Thus, when the movable funnel 27 is to be kept at the contacting position, displacement of the movable funnel 27 from the contacting position can be avoided.

With reference to FIGS. 3, 9, 12, 33 and 34, a description is provided of how the length of the intake passage is varied between when the engine 14 is rotating at high speeds and when it is rotating at low speeds.

When the engine 14 shown in FIG. 3 is rotating at a high speed, the intake pipe is shortened so that a pulsation effect can be easily obtained. That is, the movable funnel 27 is translated to its spaced position when the engine 14 is rotating at a high speed. By utilizing the pulsation effect, the intake efficiency can be improved by adjusting the length of the intake pipe such that high-pressure pulses come closer to the vicinity of the intake valve.

Specifically, as shown in FIG. 9, the rotary lever 47 is rotationally moved in G direction by the motor 46 of the funnel moving mechanism 29 to move the movable member 48 in H direction. Accordingly, an urging force in H direction is generated in the compression spring 51 (see FIG. 33) and moves the movable shaft 49 in H direction, which rotationally moves the parallel linkage 42 (see FIG. 10) in E direction. Subsequently, the parallel linkage 42 is kept rotationally moving in E direction until the stopper 44c of the lower link lever 44 comes into contact with the support column 26e as shown in FIG. 10.

This causes the movable funnel 27 to be moved to the spaced position with the opening end of the opening 27b of the movable funnel 27 kept in parallel to the opening end of the opening 26a of the stationary funnel 26. As a result, when the engine 14 (see FIG. 3) is rotating at a high speed, the intake pipe is made up of the stationary funnel 26, the throttle body 18 (see FIG. 3) and the intake port 17a (see FIG. 3) and hence can be shortened. Here, when the intake pipe is shortened when the engine 14 shown in FIG. 3 is rotating at a high speed, high-pressure pulses can easily reach the opening of the intake port 17a on the cylinder 16 side when the intake valve 19a opens, thereby improving the intake efficiency.

The position of the opening end of the movable funnel 27 on the side of the opening 26a of the stationary funnel 26 with the movable funnel 27 in the spaced position as shown in FIG. 9 is the same as that with the movable funnel 27 in the contacting position (as shown in FIG. 12) as viewed in the opening direction of the stationary funnel 26, or along an axis of the stationary funnel 26. When the movable funnel 27 is in the spaced position, the urging force of the compression spring 51 (see FIG. 33) is transmitted via the movable shaft 49 to the parallel linkage 42 so that the parallel linkage 42 rotationally moves in E direction.

When the movable funnel 27 is in the spaced position, as shown in FIG. 9, the fuel injection part 28a of the injector 28 is disposed in the air passageway 27a of the movable funnel 27. When the engine 14 is rotating at a high speed, not only the injector 20 but also the injector 28 injects fuel.

When the engine 14 shown in FIG. 3 is rotating at a low speed, the intake pipe is lengthened so that the pulsation effect can be easily obtained. That is, the movable funnel 27 is translated to its contacting position when the engine 14 is rotating at a low speed.

Specifically, as shown in FIG. 12, the rotary lever 47 is rotationally moved in I direction by the motor 46 of the funnel moving mechanism 29 to move the movable member 48 in J direction. Accordingly, an urging force in J direction is generated in the compression spring 51 (see FIG. 34) and moves the movable shaft 49 in J direction, which rotationally moves the parallel linkage 42 (see FIG. 13) in F direction. Subsequently, the parallel linkage 42 is kept rotationally moving in F direction until the stopper 44d of the lower link lever 44 comes into contact with the support column 26e as shown in FIG. 13.

This causes the movable funnel 27 to be moved to the contacting position with the opening end of the opening 27b of the movable funnel 27 kept in parallel to the opening end of the opening 26a of the stationary funnel 26. As a result, when the engine 14 (see FIG. 3) is rotating at a low speed, the intake pipe is made up of the movable funnel 27, the stationary funnel 26, the throttle body 18 (see FIG. 3) and the intake port 17a (see FIG. 3) and hence can be lengthened. Here, when the intake pipe is lengthened when the engine 14 shown in FIG. 3 is rotating at a low speed, high-pressure pulses can easily reach the opening of the intake port 17a on the cylinder 16 side when the intake valve 19a opens, thereby improving the intake efficiency.

When the movable funnel 27 is in the contacting position as shown in FIG. 12, the urging force of the compression spring 51 (see FIG. 34) is transmitted via the movable shaft 49 to the parallel linkage 42 so that the parallel linkage 42 rotationally moves in F direction.

When the engine 14 is rotating at a low speed, only the injector 20 injects fuel.

In this embodiment, as described above, the rotary shaft 41 and the parallel linkage 42 are disposed on the front side of the movable funnel 27 in the running direction of the vehicle (FWD direction indicated by the arrow) to movably support the movable funnel 27, and the motor 46 is disposed on the rear side of the movable funnel 27 in the running direction of the vehicle to drive the rotary shaft 41 and the parallel linkage 42 to move the movable funnel 27. Since the motor 46 is disposed on the opposite side (rear side) of the rotary shaft 41 and the parallel linkage 42, it is not necessary to secure a space for disposing the motor 46 around the rotary shaft 41 and the parallel linkage 42. With this construction, the surrounding area of the rotary shaft 41 and the parallel linkage 42 can be simplified.

In this embodiment, the rotary shaft 41 and the parallel linkage 42 are disposed inside the air cleaner box 24, and the motor 46 is disposed outside the air cleaner box 24. Since the motor 46 is not disposed in the way of air to be supplied to the stationary funnel 26 (intake passage), air can be smoothly supplied to the stationary funnel 26.

In this embodiment, the rotary shaft 41 and the parallel linkage 42 are disposed on the air supply side (front side) of the movable funnel 27. Since the rotary shaft 41 and the parallel linkage 42 are not disposed on the side opposite to the air supply side (rear side) where air tends to flow, disturbance of air flow by the rotary shaft 41 and the parallel linkage 42 can be restricted. With this construction, air can be smoothly supplied to the movable funnel 27 and the stationary funnel 26.

In this embodiment, one movable shaft 49 is disposed between the movable funnels 27 to transmit the driving force from the motor 46 to the rotary shaft 41 and the parallel linkage 42. Since the plurality of movable funnels 27 can be driven by the one movable shaft 49, an increase in number of parts for driving the movable funnels 27 can be avoided. With this construction, enlargement of the surrounding area of the rotary shaft 41 and the parallel linkage 42 can be avoided.

In this embodiment, by using the parallel linkage 42 to move the movable funnel 27, the opening 27b of the movable funnel 27 on the stationary funnel 26 side can be spaced apart from and brought into contact with the opening 26a of the stationary funnel 26 on the air supply side with the opening 27b of the movable funnel 27 on the fixed funnel side 26 kept in parallel to the opening end of the stationary funnel 26 on the air supply side. With this construction, even when the opening 27b of the movable funnel 27 on the stationary funnel 26 side is spaced apart from the opening 26a of the stationary funnel 26 on the air supply side, air can flow linearly through the movable funnel 27 into the stationary funnel 26, and hence an increase in air flow resistance can be restricted. As a result, a decrease in air intake efficiency can be avoided when the movable funnel 27 is spaced apart from the stationary funnel 26.

In this embodiment, the injector 20 is disposed below the stationary funnel 26 and the injector 28 is disposed above the movable funnel 27. Since the injector 28 can be disposed away from the intake port 17a, it is possible to extend the time for fuel injected from the injector 28 to be taken (supplied) into the intake port 17a. With this construction, when the engine 14 operates at a high speed and hence the flow rate of air to be taken into the intake port 17a is large, more of the fuel injected from the injector 28 can be atomized and vaporized and then taken into the intake port 17a. As a result, the combustion efficiency can be made more optimal. In addition, the temperature of the air-fuel mixture in the intake pipe can be lowered by the effect of vaporization heat due to the atomization and vaporization of more fuel. Thus, the density of the air-fuel mixture in the intake pipe can be increased. In this way, the amount of the air-fuel mixture to be taken into the intake port 17a can be increased, thereby improving the charging efficiency.

In this embodiment, the fuel injection part 28a of the injector 28 is disposed so as to be in the air passageway 27a of the movable funnel 27 when the movable funnel 27 is spaced apart from the stationary funnel 26. With this construction, fuel injected from the fuel injection part 28a of the injector 28 can be prevented from bubbling over, or otherwise being directed by air flow dynamics, out of the movable funnel 27.

The embodiment disclosed herein is intended to be illustrative in all respects, rather than restrictive. The scope of the present invention is defined by the appended claims, rather than the foregoing description of the embodiment, and is intended to include all modifications that fall within the meaning and scope equivalent to the appended claims. For example, although the present invention is applied to a motorcycle in the embodiment described above, it is not limited thereto and may also be applied to vehicles other than motorcycles. In the embodiment described above, the vehicle incorporates a four-cylinder engine. However, the present invention is not limited thereto and may also be applied to vehicles incorporating a multi-cylinder engine other than a four-cylinder one, vehicles incorporating a single-cylinder engine, and so forth.

In the embodiment described above, the rotary shaft and the parallel link are disposed on the front side of the movable funnel in the running direction of the vehicle, and the motor is disposed on the rear side of the movable funnel in the running direction of the vehicle. However, the present invention is not limited thereto, and the rotary shaft and the parallel link may be disposed on the rear side of the movable funnel in the running direction of the vehicle, and the motor may be disposed on the front side of the movable funnel in the running direction of the vehicle.

In the embodiment described above, two movable funnels are integrated together. However, the present invention is not limited thereto, and three or more movable funnels may be integrated together. Alternatively, a separate movable funnel may be provided for each cylinder.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present vehicle with variable air intake arrangement has been described in the context of particularly preferred embodiments, the skilled artisan will appreciate, in view of the present disclosure, that certain advantages, features and aspects of the vehicle with variable air intake arrangement may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A vehicle comprising:
an engine having at least one intake port;
at least one funnel assembly, comprising:
a stationary funnel for introducing intake air to the intake port of the engine; and
a movable funnel positioned on an inlet side of the stationary funnel, the movable funnel moveable to a position in which the movable funnel cooperates with the stationary funnel to introduce intake air to the intake port of the engine;
a linkage mechanism movably supporting the movable funnel;
a drive source that drives the linkage mechanism to move the movable funnel; and
a drive member extending between the linkage mechanism and the drive source so as to link the linkage mechanism to the drive source; wherein
the linkage mechanism and the drive source are arranged on substantially opposite sides of the movable funnel.

2. The vehicle of claim 1, wherein the linkage mechanism is located on one of a front side and a rear side of the movable funnel and the drive source is located on the other of the front side and the rear side of the movable funnel.

3. The vehicle of claim 1, wherein the stationary funnel and the movable funnel are positioned within a housing, and the linkage mechanism is located within the housing and the drive source is located outside of the housing.

4. The vehicle of claim 3, wherein the linkage mechanism is positioned on an upstream side of the movable funnel relative to a flow of intake air within the housing.

5. The vehicle of claim 4, wherein the flow of intake air is generally aligned with a fore and aft direction of the vehicle.

6. The vehicle of claim 1, wherein the at least one funnel assembly comprises a plurality of funnel assemblies, and the vehicle further comprises a drive shaft that transmits a driving force from the drive source to the linkage mechanism, wherein the drive shaft passes between a pair of the plurality of funnel assemblies.

7. The vehicle of claim 1, wherein the linkage mechanism includes a first linkage member supporting the movable funnel and fixed for rotation with a rotary shaft, wherein rotation of the rotary shaft moves the first linkage member thereby moving the movable funnel.

8. The vehicle of claim 1, wherein the linkage mechanism is a parallel linkage that moves the movable funnel along a substantially linear path.

9. The vehicle of claim 1, further comprising a first fuel injection system positioned downstream from the stationary funnel along a flow of intake air and a second fuel injection system positioned upstream from the movable funnel.

10. The vehicle of claim 9, wherein the second fuel injection system is positioned above the movable funnel when the movable funnel is in contact with the stationary funnel.

11. The vehicle of claim 9, wherein a fuel injection port of the second fuel injection system is positioned so as to be within an air passage of the movable funnel when the movable funnel is separated from the stationary funnel.

12. The vehicle of claim 1, wherein the at least one funnel assembly comprises a plurality of funnel assemblies, further comprising a positioning member that defines at least a first position for locating at least a first of the plurality of stationary funnels and a second position for locating at least a second of the plurality of stationary funnels.

13. The vehicle of claim 12, further comprising a housing in the form of an air cleaner box that houses the plurality of funnel assemblies, and a filter secured to the air cleaner box for filtering the inlet air, wherein the positioning member further functions as a guide for positioning the filter relative to the air cleaner box.

14. The vehicle of claim 13, wherein the positioning member comprises a cylindrical portion and the air filter comprises a hook that engages the cylindrical portion.

15. The vehicle of claim 1, further comprising a housing in the form of an air cleaner box that houses the funnel assembly, a filter secured to the air cleaner box for filtering the inlet air, and a guide member that establishes a proper position of the filter relative to the air cleaner box.

16. The vehicle of claim 1, further comprising a seal member positioned between the stationary funnel and the movable funnel.

17. A vehicle, comprising:
an engine having at least one intake port;
an air intake assembly that introduces intake air to the intake port, the air intake assembly comprising a stationary portion and a movable portion, wherein the movable portion is movable relative to the stationary portion to vary a length of the air intake assembly;
a linkage mechanism coupled to the movable portion;
a drive source that drives the linkage mechanism to move the movable portion; and
a drive member extending between the linkage mechanism and the drive source so as to link the linkage mechanism to the drive source; wherein
the linkage mechanism is located on a first side of the air intake assembly and the drive source located on a second side of the air intake assembly substantially opposite the first side.

18. The vehicle of claim 17, wherein the movable portion is separable from the stationary portion.

19. The vehicle of claim 17, wherein the linkage mechanism is located on one of a forward side and a rearward side of the air intake assembly and the drive source is located on the other of the forward side and the rearward side.

20. The vehicle of claim 17, wherein the vehicle is a motorcycle.

* * * * *